United States Patent
Tai et al.

(10) Patent No.: US 6,301,046 B1
(45) Date of Patent: Oct. 9, 2001

(54) INTERLEAVER/DEINTERLEAVERS CAUSING LITTLE OR NO DISPERSION OF OPTICAL SIGNALS

(75) Inventors: Kuochou Tai, Fremont; Kok-Wai Chang, Los Altos; Jye-Hong Chen, San Jose, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/517,640

(22) Filed: Mar. 3, 2000

Related U.S. Application Data

(63) Continuation-in-part of application No. 09/476,034, filed on Dec. 31, 1999, and a continuation-in-part of application No. 09/476,611, filed on Dec. 31, 1999.

(51) Int. Cl.[7] .............................. G02B 5/30; H01J 14/00
(52) U.S. Cl. .................. 359/498; 359/494; 359/495; 359/497; 359/499; 359/115; 359/124
(58) Field of Search ............................. 359/494, 495, 359/496, 497, 498, 499, 115, 124, 127, 128, 129, 156, 122, 484; 385/11, 15, 16, 27, 47

(56) References Cited

U.S. PATENT DOCUMENTS 4,464,022   8/1984   Emkey .

(List continued on next page.)

FOREIGN PATENT DOCUMENTS 60-59318A * 4/1985 (JP) .

OTHER PUBLICATIONS

E.O. Ammann, "Synthesis of Optical Birefringement Networks", Progress in Optics, 1971, pp. 123–177, vol. IX, North–Holland Publishing Company, Amsterdam.

(List continued on next page.)

Primary Examiner—Cassandra Spyrou
Assistant Examiner—John Juba, Jr.
(74) Attorney, Agent, or Firm—Randy W. Lacasse; Kevin E. Greene; Lacasse & Associates

(57) ABSTRACT

Interleaver/deinterleavers for combining/separating optical channels. An interleaver/deinterleaver is "folded" when an optical signal follows an optical path that passes through a birefringent element multiple times. Double-pass refers to optical signals following a (folded) path through the birefringent element twice. Multi-pass refers to optical signals following a (folded) path through the birefringent element multiple times. When operating as a deinterleaver, the interleaver/deinterleaver separates an optical signal (e.g., WDM signal) into subsets of optical signals (e.g., even and odd ITU channels). When operating as an interleaver, the interleaver/deinterleaver mixes subsets of optical signals into a multiplexed optical signal. The interleaver/deinterleaver can be used to increase the bandwidth of an optical network. For example, the interleaver/deinterleaver can be used to interface components designed for a first channel spacing (e.g., 100 GHz) to components designed for a second channel spacing (e.g., 200 GHz). Folded interleaver/deinterleavers cause dispersion because the speed at which the ordinary beam of an optical signal passes through the birefringent element is different that the speed at which the extraordinary beam of the optical signal passes through the birefringent element. In order to reduce or eliminate dispersion, the polarization of the optical signal is reversed for alternating passes through the birefringent crystal. For example, if a signal is horizontally polarized for a first pass through the birefringent crystal, the signal is rotated to be vertically polarized for a second pass through the birefringent crystal. For a third pass through the birefringent element, the signal is rotated to be horizontally polarized.

37 Claims, 21 Drawing Sheets

U.S. PATENT DOCUMENTS

| | | | |
|---|---|---|---|
| 4,474,434 | | 10/1984 | Carlsen et al. . |
| 4,474,435 | | 10/1984 | Carlsen et al. . |
| 4,514,046 | | 4/1985 | Carlsen et al. . |
| 4,566,761 | | 1/1986 | Carlsen et al. . |
| 4,685,773 | | 8/1987 | Carlsen et al.. |
| 4,744,075 | * | 5/1988 | Buhrer ................................. 359/495 |
| 4,745,591 | * | 5/1988 | Foley .................................. 359/495 |
| 4,987,567 | * | 1/1991 | Buhrer ................................. 359/495 |
| 5,204,771 | | 4/1993 | Koga ................................... 359/484 |
| 5,414,540 | * | 5/1995 | Patel et al. ............................. 385/17 |
| 5,471,340 | | 11/1995 | Cheng et al. ......................... 358/484 |
| 5,488,500 | | 1/1996 | Glance ................................. 359/127 |
| 5,546,219 | * | 8/1996 | Iida ..................................... 359/495 |
| 5,611,004 | | 3/1997 | Chang et al. .......................... 385/11 |
| 5,694,233 | | 12/1997 | Wu et al. .............................. 359/117 |
| 5,712,717 | | 1/1998 | Hamel et al. ......................... 359/130 |
| 5,724,165 | | 3/1998 | Wu ...................................... 359/117 |
| 5,737,104 | | 4/1998 | Lee et al. .............................. 359/124 |
| 5,764,825 | | 6/1998 | Mugino et al. ........................ 385/24 |
| 5,778,118 | | 7/1998 | Sridhar ................................. 385/24 |
| 5,808,763 | | 9/1998 | Duck et al. ........................... 359/127 |
| 5,822,905 | | 10/1998 | Taga et al. ............................ 359/127 |
| 5,835,517 | | 11/1998 | Jayaraman et al. .................... 372/50 |
| 5,852,505 | | 12/1998 | Li ........................................ 359/118 |
| 5,867,291 | | 2/1999 | Wu et al. .............................. 359/124 |
| 5,912,748 | * | 6/1999 | Wu et al. .............................. 359/117 |
| 5,915,051 | | 6/1999 | Damask et al. ........................ 385/16 |
| 5,926,587 | | 7/1999 | Chen et al. ............................ 385/14 |
| 5,930,039 | | 7/1999 | Li et al. ................................ 359/484 |
| 5,974,205 | | 10/1999 | Chang ................................... 385/11 |
| 6,002,503 | | 12/1999 | Mizrahi ................................ 359/124 |
| 6,049,404 | * | 4/2000 | Wu et al. .............................. 359/117 |
| 6,061,484 | | 5/2000 | Jones et al. ............................ 385/24 |
| 6,169,626 | * | 1/2001 | Chen et al. ........................... 359/279 |
| 6,175,432 | * | 1/2001 | Wu et al. .............................. 359/124 |
| 6,212,313 | * | 4/2001 | Li ........................................ 359/117 |

OTHER PUBLICATIONS

Shaoping Bian, Kebin Xu, & Jing Hong, "Optical Perfect Shuffle Using Wollaston Prisms", Applied Optics, Jan. 10, 1991; pp. 173–174, vol. 30, No. 2, USA.

Jack L. Jewell, S.L. McCall, Y.H. Lee, A. Scherer, A.C. Gossard, & J.H. English, "Optical Computing and Related Microoptic Devices", Applied Optics, Dec. 1, 1990, pp. 5050–5053, vol. 29, No. 34, USA.

Miles Murdocca, "Connection Routing for Microoptic Systems", Applied Optics, Mar. 10, 1990, pp. 1106–1110, vol. 29, No. 8, USA.

Kazuhiro Noguchi, Toshikazu Sakano, & Takao Matsumoto, "A Rearrangeable Multichannel Free–Space Optical Switch Based on Multistage Network Configuration", Journal of Lightwave Technology, Dec. 1991, pp. 1726–1732, vol. 9, No. 12, USA.

K. Shiraishi, T. Sato, & S. Kawakami, "Experimental Verification of a Form–Birefringent Polarization Splitter", Applied Physics Letters, Jan. 21, 1991, pp. 211–212, vol. 58, No. 3, USA.

Masataka Shirasaki & Kunihiko Asama, "Compact Optical Isolator for Fibers Using Birefringent Wedges", Applied Optics, Dec. 1, 1982, pp. 4296–4299, vol. 21, No. 23, USA.

E. O. Ammann, "Synthesis of Electro–Optic Shutters having a Prescribed Transmission vs Voltage Characteristic", Journal of the Optical Society of America, Aug. 1966, pp. 1081–1088, vol. 56, No. 8, USA.

S.E. Harris, E. O. Ammann & I.C. Chang, "Optical Network Synthesis Using Birefringent Crystals", Journal of the Optical Society of America, Oct. 1964, pp. 1267–1279, vol. 54, No. 10, USA.

Benjamin B. Dingel & Masayuki Izutsu, "Multifunction Optical Filter with a Michelson–Gires–Tournois Interferometer for Wavelength–Division–Multiplexed Network System Applications", Optics Letters; Jul. 15, 1998; pp. 1099–1101, vol. 23, No. 14, Optical Society of America, USA.

Benjamin B. Dingel & Tadashi Aruga, "Properties of a Novel Noncascaded Type, Easy–to–Design, Ripple–Free Optical Bandpass Filter", Journal of Lightwave Technology, Aug. 1999, pp. 1461–1469, vol. 17, No. 8, USA.

Amnon Yariv and Pochi Yeh, "Jones Calculus and its Application to Birefringent Optical Systems." Optical Waves in Crystals, Propogation and Control of Laser Radiation, 1984, pp. 121–155, John Wiley & Sons, Inc., USA.

* cited by examiner

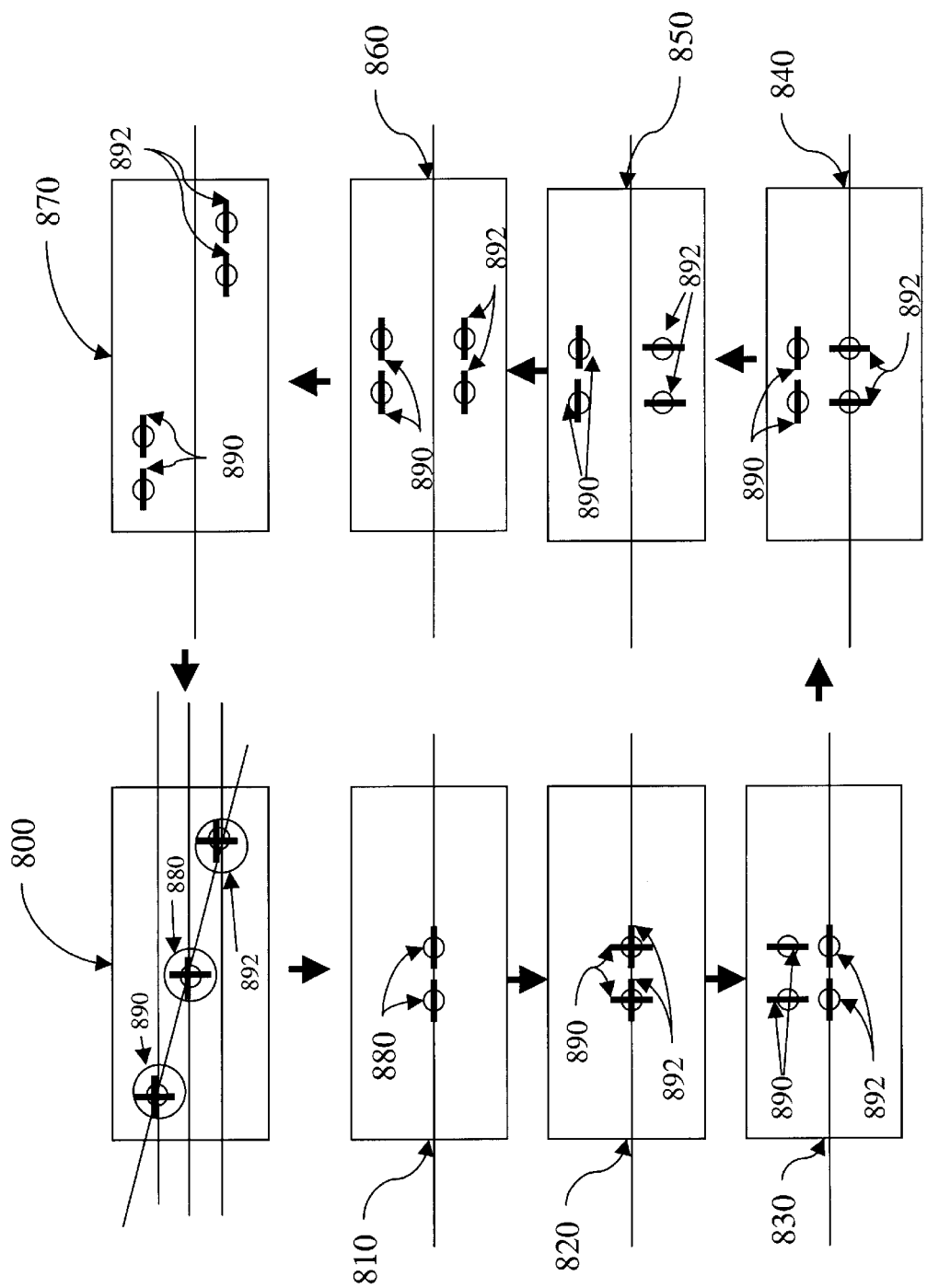

| Propagation Direction | Input Polarization | Output Polarization | Dispersion Slope | ITU Channel |
|---|---|---|---|---|
| Forward | H | H | Negative | Even |
| | | V | Negative | Odd |
| | V | H | Positive | Odd |
| | | V | Positive | Even |
| Backward | H | H | Negative | Even |
| | | V | Positive | Odd |
| | V | H | Negative | Odd |
| | | V | Positive | Even |

Fig. 14

INTERLEAVER/DEINTERLEAVERS CAUSING LITTLE OR NO DISPERSION OF OPTICAL SIGNALS

The present application is a continuation-in-part of: U.S. patent application Ser. No. 09/476,034 entitled "DOUBLE-PASS FOLDED INTERLEAVER/DEINTERLEAVERS"pending and U.S. patent application Ser. No. 09/476,611 entitled "MULTI-PASS FOLDED INTERLEAVER/DEINTERLEAVERS", pending both of which were filed Dec. 31, 1999.

FIELD OF THE INVENTION

The invention relates to optical devices. More particularly, the invention relates to an interleaver/deinterleaver having a folded design that causes little or no dispersion in optical signals.

BACKGROUND OF THE INVENTION

As telecommunications usage increases as a result of, for example, increased Internet usage, increased types of communications, and population growth, telecommunications providers are required to provide greater voice- and data-carrying capacity. In order to reduce cost and the amount of time required to provide the increased capacity wavelength division multiplexing (WDM) and dense wavelength division multiplexing (DWDM) have been developed, which provide increased capacity without requiring new fiber optic cables.

WDM and DWDM technologies combine multiple optical signals into a single fiber by transporting different signals on a different optical wavelengths or channels. Interleaving and deinterleaving of optical channels is typically accomplished with thin film optical filters. However, multiple layers of film are required to interleave and deinterleave multiple channels, which increases the cost and complexity of a component. Another disadvantage of multiple layers of thin film for filtering is that the thin films break down over time, especially when operating under high power conditions.

What is needed is an improved optical device for use with WDM and/or DWDM optical signals. Prior attempts to improve optical devices are disclosed in U.S. Pat. No. 4,566,761 issued Jan. 28, 1986 to Carlsen et al; U.S. Pat. No. 4,685,773 issued Aug. 11, 1987 to Carlsen et al; and U.S. Pat. No. 5,694,233 issued Dec. 2, 1997 to Wu et al, which are incorporated herein by reference.

SUMMARY OF THE INVENTION

Folded interleaver/deinterleavers causing little or no dispersion of optical signals are described. In one embodiment, the interleaver/deinterleaver includes a birefringent element and a reflective elements positioned to reflect an optical signal having a first polarization through the birefringent element along a first optical path. The interleaver/deinterleaver also includes a walk-off crystal positioned to receive the optical signal from the birefringent element. The walk-off crystal offsets the optical signal. A mirror is positioned to reflect the signals back to the birefringent element and the plurality of reflective elements along a second optical path that is parallel to the first optical path such that the optical signal following the second optical path has a polarization that is orthogonal to the first polarization. An optical signal received via a first port is separated into a first subset and a second subset directed to a second port and a third port, respectively, and optical signals received via the second port and the third port are combined and directed to the first port.

BRIEF DESCRIPTION OF THE DRAWINGS

The invention is illustrated by way of example, and not by way of limitation in the figures of the accompanying drawings in which like reference numerals refer to similar elements.

FIG. 8 illustrates a cross-sectional view of polarization states of a double-pass optical interleaver/deinterleaver as illustrated in FIGS. 6 and 7.

FIG. 9b illustrates a top view of one embodiment of a multi-pass optical interleaver/deinterleaver causing reduced dispersion as compared to the interleaver/deinterleaver of FIG. 9a.

FIG. 10a illustrates a side view of the multi-pass optical interleaver/deinterleaver of FIG. 9a.

FIG. 14 is a table summarizing one approach to providing reduced or no dispersion in an optical interleaver/deinterleaver.

DETAILED DESCRIPTION

Figure 1:
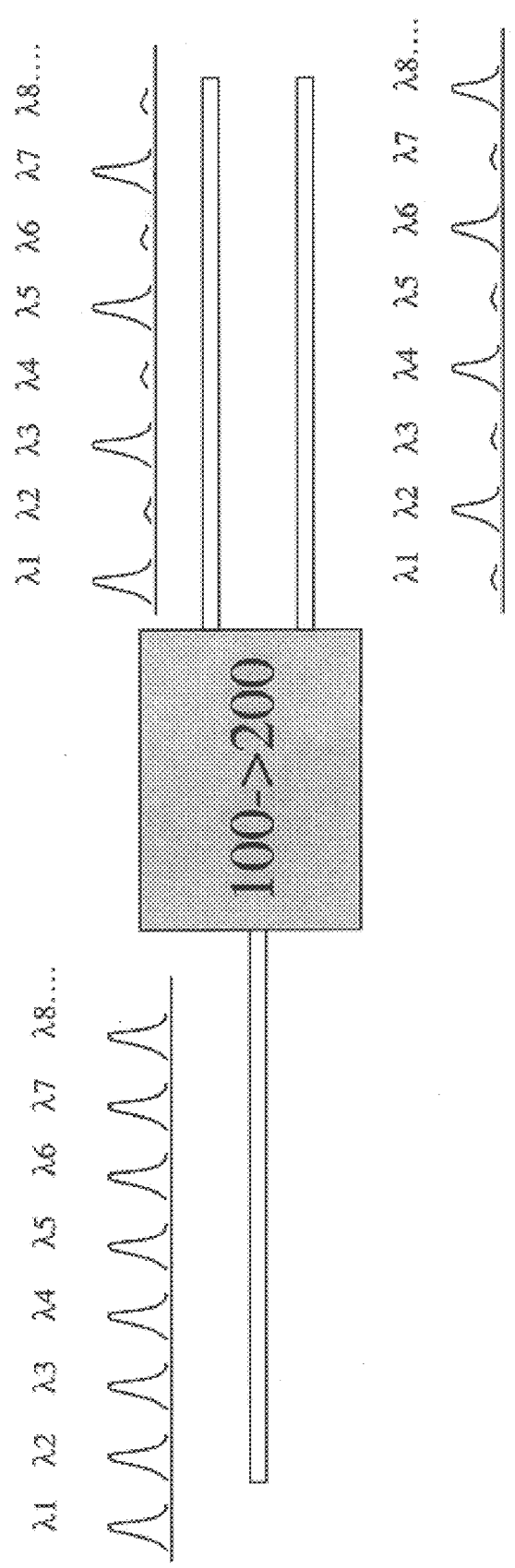
FIG. 1 is a conceptual illustration of a conversion from an optical channel scheme having 100 GHz spacing to an optical channel scheme having 200 GHz.

Folded interleaver/deinterleavers causing little or no dispersion of optical signals are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Interleaver/deinterleaver apparatuses for combining/separating optical channels are described. An interleaver/deinterleaver apparatus is described as folded when an optical signal follows an optical path that passes through a birefringent element multiple times. Double-pass refers to the optical signal following a (folded) path through the birefringent element twice. Multi-pass refers to the optical signal following a (folded) path through the birefringent element three or more times. When operating as a deinterleaver, the interleaver/deinterleaver separates an optical signal (e.g., WDM signal) into subsets of optical signals (e.g., channels). In one embodiment, deinterleaving optical signals separates an optical signal into even and odd International Telecommunications Union (ITU) channels.

When operating as an interleaver, the interleaver/deinterleaver mixes subsets of optical signals (e.g., channels) into a multiplexed (e.g., WDM, DWDM) optical signal. The interleaver/deinterleaver apparatus can be used to increase the bandwidth of an optical network. For example, the interleaver/deinterleaver can be used to interface components designed for a first channel spacing (e.g., 100 GHz) to components designed for a second channel spacing (e.g., 200 GHz). In one embodiment, interleaving combines even and odd ITU channels into a single optical signal.

The birefringent assemblies of folded interleaver/deinterleavers cause dispersion because the speed at which the ordinary beam of an optical signal passes through the birefringent element is different that the speed at which the extraordinary beam of the optical signal passes through the birefringent element. In order to reduce or eliminate dispersion of optical signals that make two or more passes through the birefringent element, the polarization of the optical signal is reversed for alternating passes through the birefringent crystal. For example, if a signal is horizontally polarized for a first pass through the birefringent crystal, the signal is rotated to be vertically polarized for a second pass through the birefringent crystal. For a third pass through the birefringent element, the signal is rotated to be horizontally polarized.

FIG. 1 is a conceptual illustration of a conversion from an optical channel scheme having 100 GHz spacing to an optical channel scheme having 200 GHz. The conversion of FIG. 1 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 1 is a deinterleaver that separates an optical signal having even and odd channels (e.g., ITU channels) into a first optical signal including the even channels and a second optical signal including the odd signals. After the signals are deinterleaved, the odd channels have a 200 GHz spacing and the even channels have a 200 GHz spacing. Recombining the even and the odd channels can be accomplished with an interleaver that combines the odd channels and the even channels into a single optical signal. In other words, the even and odd channels having 200 GHz spacing are combined (interleaved) into an optical signal having 100 GHz signal spacing. Similar interleaving can be provided to convert between 50 GHz spaced channels and 100 GHz spaced channels, as well as between other sets of channel spacing schemes.

Figure 2:
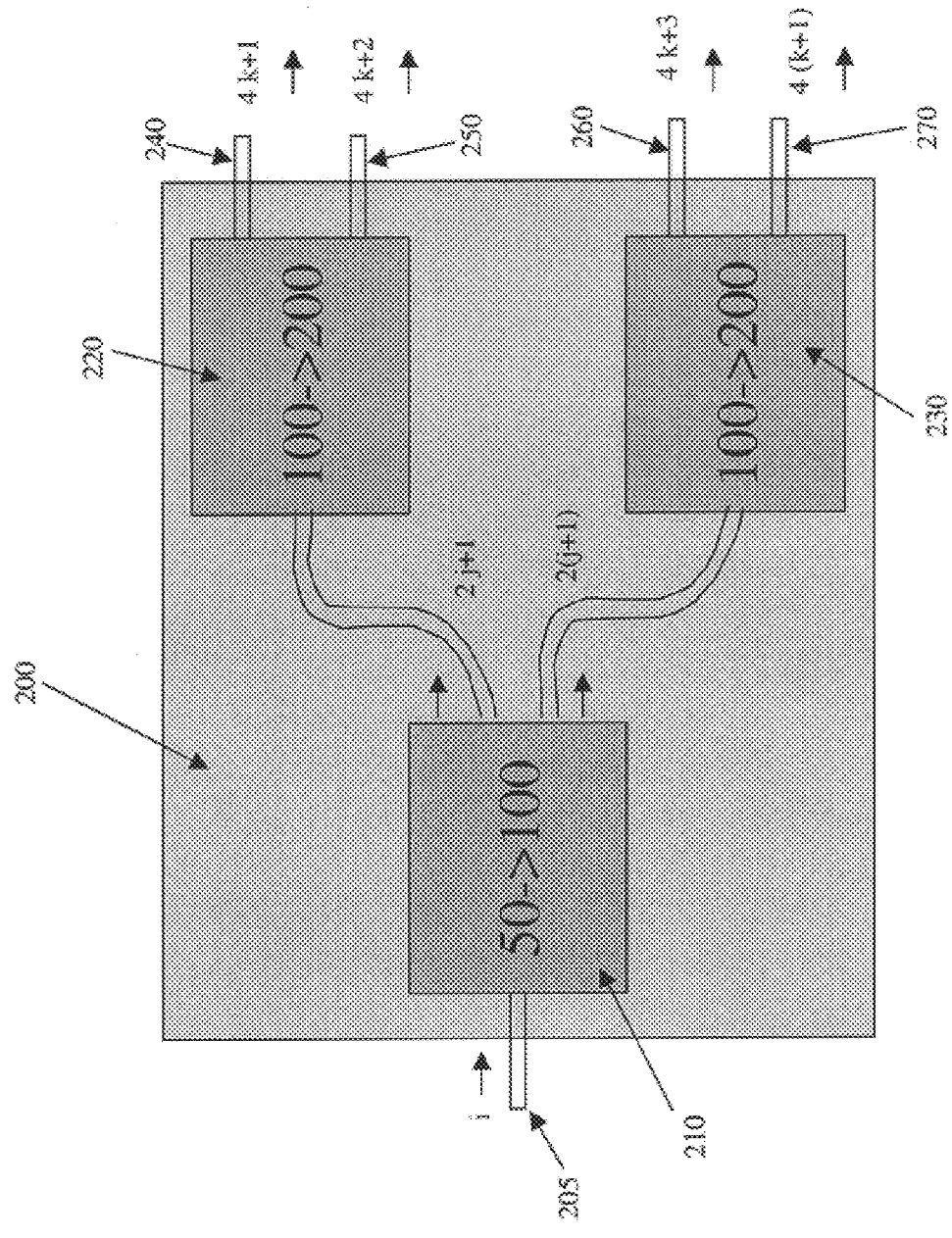
FIG. 2 is a block diagram of an optical deinterleaver for conversion from an optical channel scheme having 50 GHz spacing to an optical channel scheme having 200 GHz spacing.

FIG. 2 is a block diagram of an optical deinterleaver for conversion from an optical channel scheme having 50 GHz spacing to an optical channel scheme having 200 GHz spacing. In general, deinterleaver 200 includes deinterleaver 210 to convert from one set of 50 GHz spaced channels to two sets of 100 GHz spaced channels. Deinterleaver 200 also includes two deinterleavers (220 and 230) each of which convert one of the sets of 100 GHz spaced channels to two sets of 200 GHz spaced channels. Deinterleaver 200 allows devices designed for 200 GHz spaced channels to interact with devices or networks designed for 50 GHz spaced channels.

Optical fiber 205 carries a set of optical channels, i, having 50 GHz spacing. Deinterleaver 210 separates the set of optical channels into sets of even, 2(j+1), and odd, 2j+1, channels. The even channels are input to deinterleaver 230 and the odd channels are input deinterleaver 220. The even and the odd channels have 100 GHz spacing.

Deinterleavers 220 and 230 operate to further separate the set of optical channels. Conceptually, deinterleaver 220 and 230 operate on the respective 100 GHz spaced channels to separate the input channels into "even" and "odd" channels. The sets of channels output by deinterleavers 220 and 230 have 200 GHz spacing.

Deinterleaver 220 separates the odd channels into two sets of channels, odd-odd channels, 4k+1, output by optical fiber 240 and odd-even, 4k+2, channels output by optical fiber 250. Deinterleaver 230 separates the even channels into two sets of channels, the even-odd, 4k+3, channels output by optical fiber 260 and the even-even, 4(k+1), channels output by optical fiber 270.

The four sets of channels output by deinterleaver 200 are 200 GHz spaced channels. Thus, deinterleaver 200 can be used to interface one or more devices designed to operate on 200 GHz spaced channels with one or more devices or networks designed to operate on 50 GHz spaced channels. Other channel spacings can also be supported.

Figure 3:
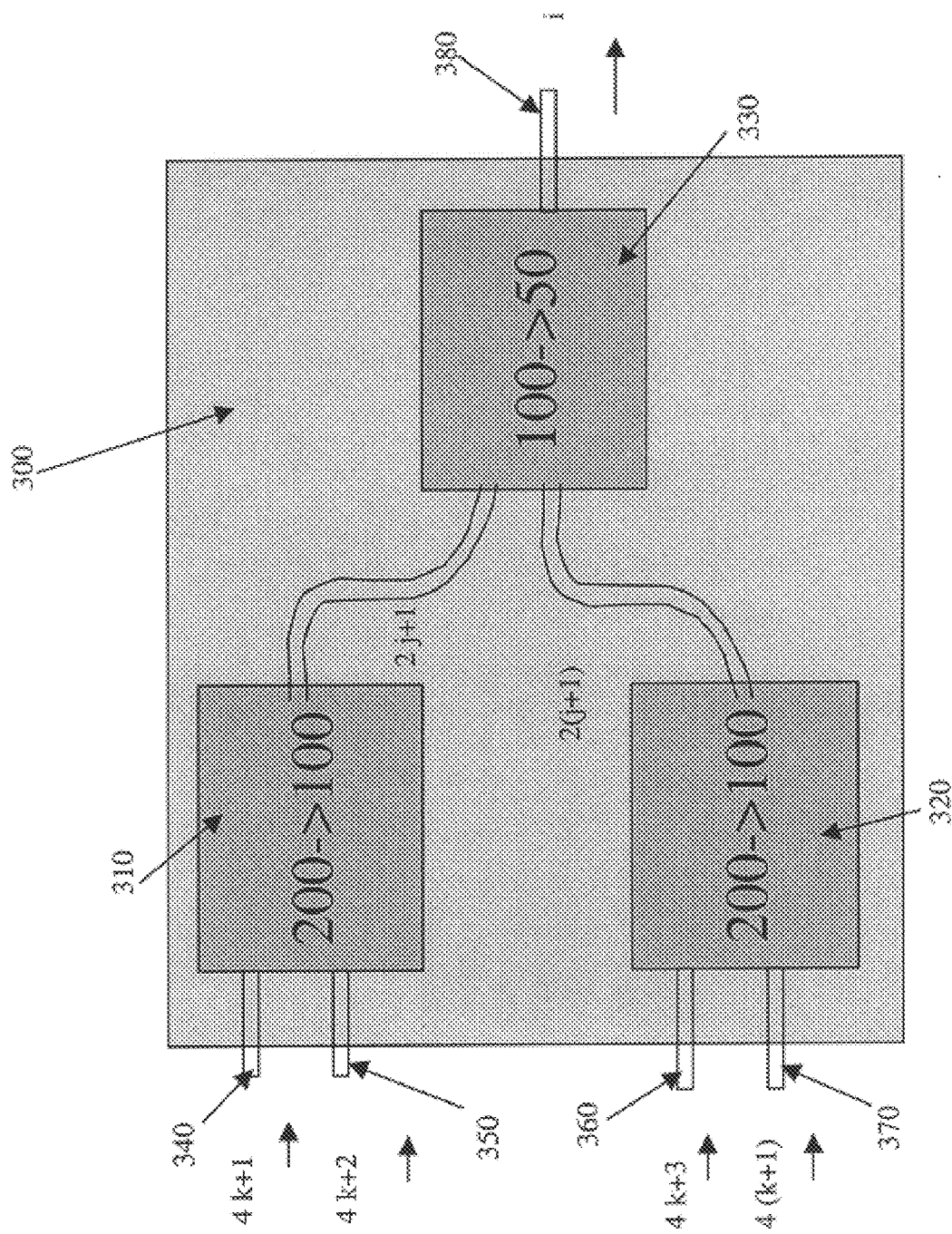
FIG. 3 is a block diagram of an optical interleaver for conversion from an optical channel scheme having 200 GHz spacing to an optical channel scheme having 50 GHz spacing.

FIG. 3 is a block diagram of an optical interleaver for conversion from an optical channel scheme having 200 GHz spacing to an optical channel scheme having 50 GHz spacing. In general, interleaver 300 includes interleaver 310 to convert from two sets of 200 GHz spaced channels to one set of 100 GHz spaced channels. Similarly, interleaver 320 converts from two sets of 200 GHz spaced channels to one set of 100 GHz channels. Interleaver 330 converts the two sets of 100 GHz spaced channels to one set of 50 GHz spaced channels. Interleaver 300 allows devices designed for 200 GHz spaced channels to interact with devices or networks designed for 50 GHz spaced channels.

The odd-odd, 4k+1, channels having 200 GHz spacing are input to interleaver 310 via optical fiber 340. The odd-even, 4k+2, channels having 200 GHz spacing are input to interleaver 310 via optical fiber 350. Interleaver 310 interleaves the odd-odd channels and the odd-even channels to generate a set of odd, 2j+1, channels having 100 GHz spacing.

The even-odd, 4k+3, channels having 200 GHz spacing are input to interleaver 320 via optical fiber 360. The even-even, 4(k+1), channels having 200 GHz spacing are input to interleaver 320 via optical fiber 370. Interleaver 320 interleaves the even-odd channels and the even-even channels to generate a set of even, 2(j+1), channels having 100 GHz spacing.

Interleaver 330 interleaves the even and odd channels to generate a set of channels, i, having 50 GHz spacing. Thus, interleaver 300 allows devices designed to operate on optical channels having 200 GHz spacing to interact with devices designed to operate on optical channels having 50 GHz spacing. Other channels spacings can also be supported.

Figure 4A:
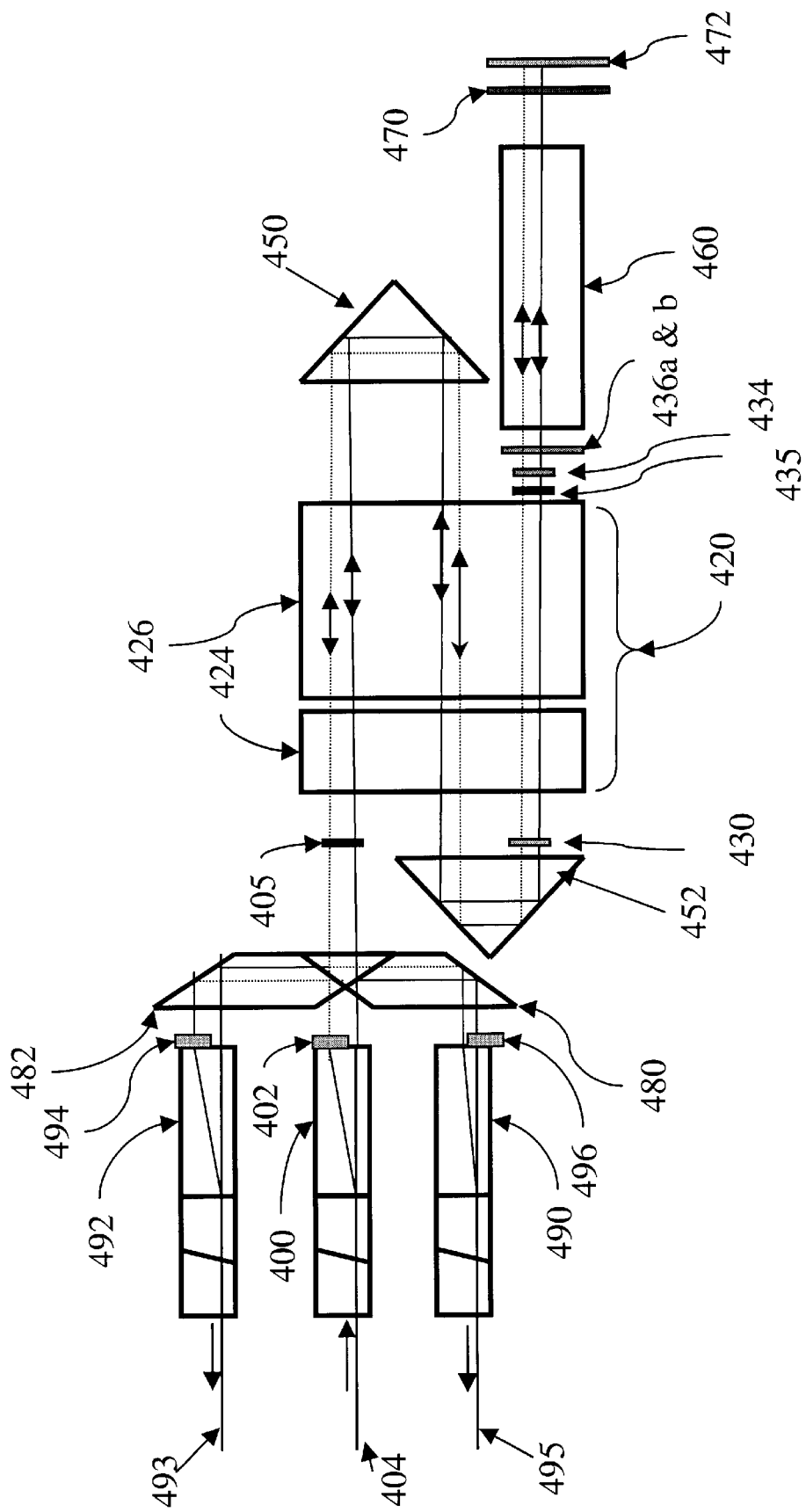
FIG. 4a illustrates a top view of one embodiment of a double-pass folded interleaver/deinterleaver that causes dispersion.

FIG. 4a illustrates a top view of one embodiment of a double-pass folded interleaver/deinterleaver that causes dispersion. The arrows of FIG. 4a correspond to the double-pass folded interleaver/deinterleaver operating as a deinterleaver. In other words an optical signal carrying information on multiple frequencies, for example, a wavelength division multiplexed (WDM) signal is receives and separated into two optical signals, each of which include a predetermined subset of frequencies (e.g., even channels and odd channels) from the input optical signal. Alternate embodiments of a double-pass folded interleaver/deinterleavers can be found in the parent patent applications referenced above.

The cause of the dispersion is described in greater detail below. As a brief overview, the optical signal is horizontally polarized prior to the first pass through the birefringent element. The even and odd channels are separated by half wave plates and the birefringent element during the first pass. The signal is then reflected and rotated to be orthogonally polarized for a second pass through the birefringent element. The birefringence of the birefringent element causes dispersion of the optical signal.

An optical signal is received through port 400. In one embodiment, port 400 is a collimator assembly having a GRIN lens to collimate the light and a walk-off crystal to separate the horizontally polarized and the vertically polarized components of the optical signal. Other types of lenses can also be used, or pre-collimated light can be received. Port 400 receives an optical signal via an optical fiber 404 and collimates the optical signal with the GRIN lens.

In one embodiment, port 400 also includes half wave plate 402 to rotate either the vertically polarized component or the horizontally polarized component of the optical signal. In one embodiment, half wave plate 402 has an azimuth angle of 45° with respect to an optical signal received by port 400 from optical fiber 404. In one embodiment, the walk-off crystal of port 400 offsets the vertically polarized component of the optical signal and half wave plate 402 causes the vertically polarized component to be horizontally polarized such that both components are horizontally polarized when the components pass through polarizer 405.

The collimated optical signal is directed to polarizer 405 through an opening between walk-off crystal 480 and walk-off crystal 482. In one embodiment, polarizer 405 provides polarization in the range of 0° to 15° (e.g., 2.6°) for optical signals passing from port 400 to birefringent element 420, however, other polarizations can be provided based on, for example, the azimuth angles of one or more half wave plates.

After passing through polarizer 405, the optical signal is directed to birefringent element 420. In one embodiment, birefringent element 420 is composed of crystals 424 and 426 that are selected to provide improved thermal stability over a range of operating temperatures as compared to a single birefringent crystal. In one embodiment, crystal 424 is a $TiO_2$ crystal having a thickness of 2 mm, and crystal 426 is a $YVO_4$ crystal having a thickness of 9.5 mm; however, other sizes can also be used. Other birefringent assemblies can also be used, for example, a single crystal can be used if temperature stability is not important, or other two-crystal birefringent assemblies can be used.

After passing through birefringent element 420, the optical signal is reflected by reflective element 450. In one embodiment, reflective element 450 is a 90° reflecting crystal; however, other reflective elements can be used based on, for example, the physical layout of the interleaver/deinterleaver. In one embodiment, the face(s) through which the optical signal is received and/or reflected has a low-order compensator to compensate for phase shift in the respective crystals. In alternate embodiments, the loworder compensator can be omitted.

The optical signal reflected by reflective element 450 is directed through birefringent element 420 to reflective element 452. After being reflected by reflective element 452, the optical signal passes through half wave plate 430. In one embodiment, half wave plate 430 is oriented with the an azimuth angle in the range of 0° to −15° (e.g., −6.5°) for optical signals passing from birefringent element 420 to reflective element 450. Other azimuth angles for half wave plate 430 or can be used for different filtering characteristics or physical configurations. Half wave plate 430 introduces a relative phase difference of 180° between the ordinary and extraordinary components of the optical signal.

After passing through birefringent element 420 as reflected by reflective element 452, the optical signal passes through half wave plate 434. In one embodiment, half wave plate 434 has an azimuth angle is in the range of 15° to 30° (e.g., 22.5°) for optical signals passing from to birefringent element 420 to walk-off crystal 460. Other azimuth angles for half wave plate 434 can be used for different filtering characteristics or physical configurations.

Tuning plate 435 is used to tune the interleaver/deinterleaver. The thickness of tuning plate 435 is chosen to center the passbands of the interleaver/deinterleaver around desired frequencies. In one embodiment tuning plate 435 is made of quartz ($SiO_2$); however, other materials can be used.

Figure 4B:
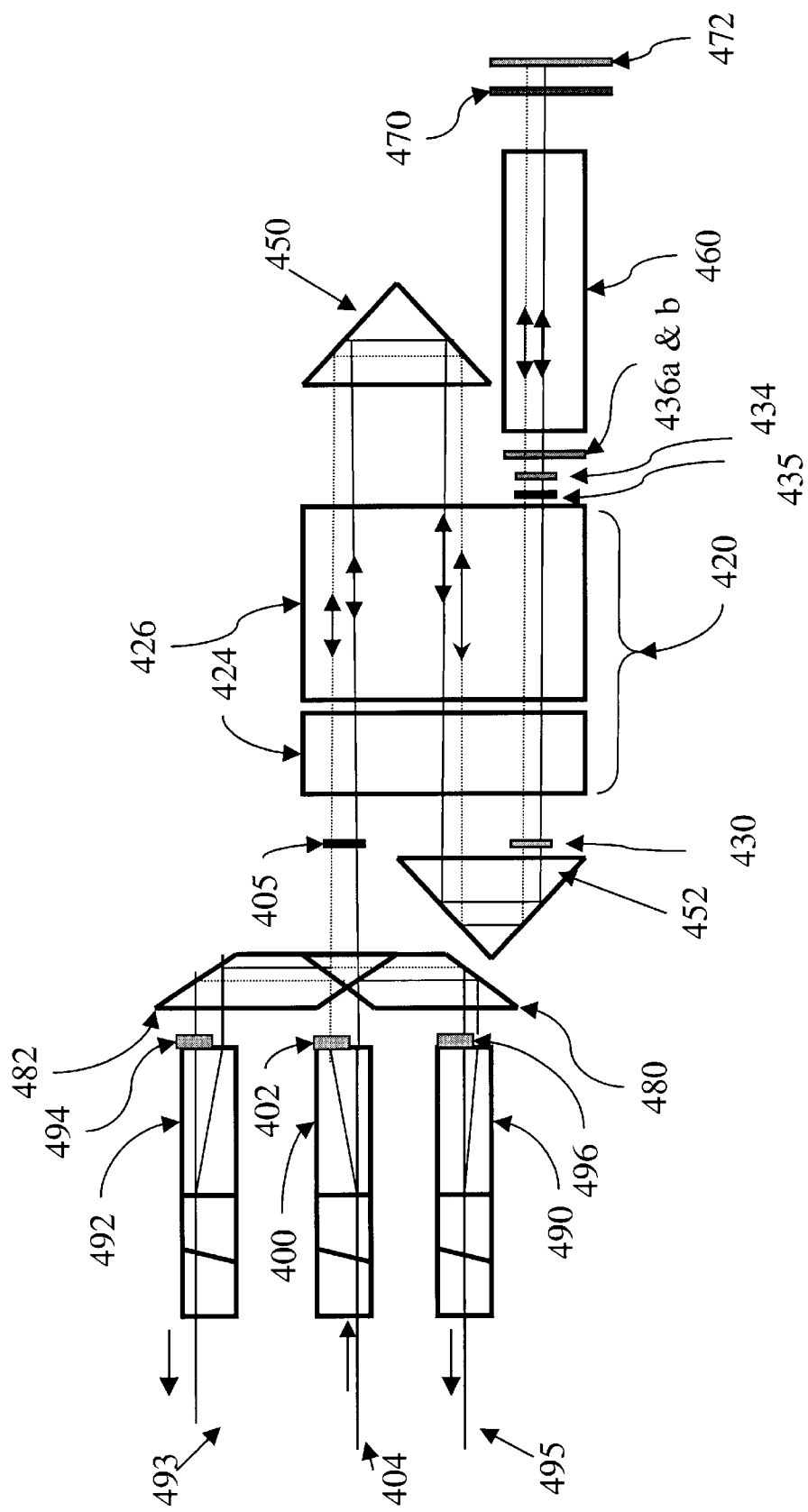
FIG. 4b illustrates a top view of one embodiment of a double-pass folded interleaver/deintereaver that causes dispersion.

Tuning of interleaver/deinterleavers is described in greater detail in U.S. patent application Ser. No. 09/517,641 (P060), entitled "TUNING OF OPTICAL DEVICES," which is filed contemporaneously herewith, an assigned to the corporate assignee of the present application. The interleaver/deinterleavers described below can also be tuned with a tuning plate; however, for simplicity of description, only the interleaver/deinterleavers of FIGS. 4a, 4b and 4c are illustrated with tuning plates.

When the optical signal is traveling from birefringent element 420, the optical signal passes between half wave plates 436a and 436b. One configuration for half wave plates 436a and 436b is described in greater detail below with respect to FIG. 5. In one embodiment, the azimuth angle of half wave plates 436a and 436b are in the range of 40° to 50° (e.g., 45°) for optical signals passing from walk-off crystal 460 to birefringent element 420; however, the azimuth angle can be different with appropriate changes to the azimuth angles of one or more other half wave plates and/or polarizer 405.

The optical signals pass through half wave plate 470 and are reflected by quarter wave mirror 472. In one embodiment, the azimuth angle of half wave plate 470 is in the range of 40° to 50° (e.g., 45°) for optical signals passing from walk-off crystal 460 to quarter wave mirror 472; however, the azimuth angle can be different with appropriate changes to the azimuth angles of one or more other half wave plates and/or polarizer 405. The effect of walk-off crystal 460 is described in greater detail below with respect to FIG. 5. Quarter wave mirror 472 reflects the optical signals back through walk off crystal 460. Quarter wave mirror 472 also introduces a phase shift of 90° to the ordinary and extraordinary components of the optical signal.

Half wave plates 436a and 436b rotate the optical signal components to an orthogonal polarization. After passing through half wave plates 436a and 436b, the optical signals pass through birefringent element 420 through half wave plate 430 and are reflected by reflective element 452 through birefringent element 420 to reflective element 450. Reflective element 450 reflects the signals through birefringent element 420, and polarizer 405 to walk-off crystals 480 and 482. Walk-off crystals 480 and 482 direct the optical signals to ports 490 and 492, respectively.

Port 490 includes half wave plate 496 and port 492 includes half wave plate 494. In one embodiment, both half wave plate 494 and half wave plate 496 have azimuth angles of 45° with respect to optical signals received from walk-off crystal 482 and walk-off crystal 480, respectively. Half wave plate 494 and 496 rotate the optical components received such that ports 492 and 490, respectively, each receive a vertically polarized component and a horizontally polarized component, which are combined and directed to optical fibers 493 and 495, respectively.

The interleaver/deinterleaver of FIG. 4a has two sources of dispersion. The first source of dispersion is birefringent element 420. During the first pass through birefringent element 420, both the ordinary and the extraordinary beams of the optical signal are horizontally polarized. During the first pass through the birefringent element one of the beams travels faster than the other beam, which causes dispersion. During the second pass through the birefringent element, the same beam travels faster, which increases the dispersion. In other words, double-pass interleaver/de-interleavers cause twice the dispersion of a single-pass interleaver/deinterleaver.

The second source of dispersion is unequal optical path lengths for the ordinary and extraordinary beams. In FIG. 4a, the extraordinary beam is illustrated with a dashed line. In each of the walk off crystals of ports 400, 490 and 492 the extraordinary beam has a longer optical path length than the ordinary beam. This is referred to as polarization mode dispersion (PMD).

For the optical device of FIG. 4a to operate as an interleaver, two sets of optical signals are input to ports 490 and 492. The two sets of optical signals are combined in a manner that is the reverse of the deinterleaver function described above. The combined (interleaved) optical signal is output through port 400. Thus, the apparatus illustrated in FIG. 4 can operate as an interleaver or as a deinterleaver.

In one embodiment, the interleaver/deinterleaver of FIG. 4a is angle tuned to compensate for manufacturing tolerances. In one embodiment, angle tuning is accomplished by rotating birefringent element 420 after the interleaver/deinterleaver has been assembled so that the signals (e.g., ITU channels) interleaved or deinterleaved match the desired characteristics. Birefringent element 420 is rotated to increase the optical path length of the signals passing through birefringent element 420. When the desired optical path length is provided, birefringent element 420 is maintained in the desired position through, for example, use of epoxy or soldering techniques.

FIG. 4b illustrates a top view of one embodiment of a double-pass folded interleaver/deinterleaver that causes dispersion. The interleaver/deinterleaver of FIG. 4b operates in the same manner as the interleaver/deinterleaver of FIG. 4a, except that the optical path lengths for the ordinary and extraordinary beams are equal. In the deinterleaver input port 400, the walk off crystal causes the extraordinary beam to have a greater optical path length than the ordinary beam. In the deinterleaver output ports 490 and 492, the walk off crystal cause the ordinary beam to have a greater optical path length than the extraordinary beam. When operating as an interleaver, the input and output ports have reverse roles as compared to those described above for the deinterleaver.

Figure 5:
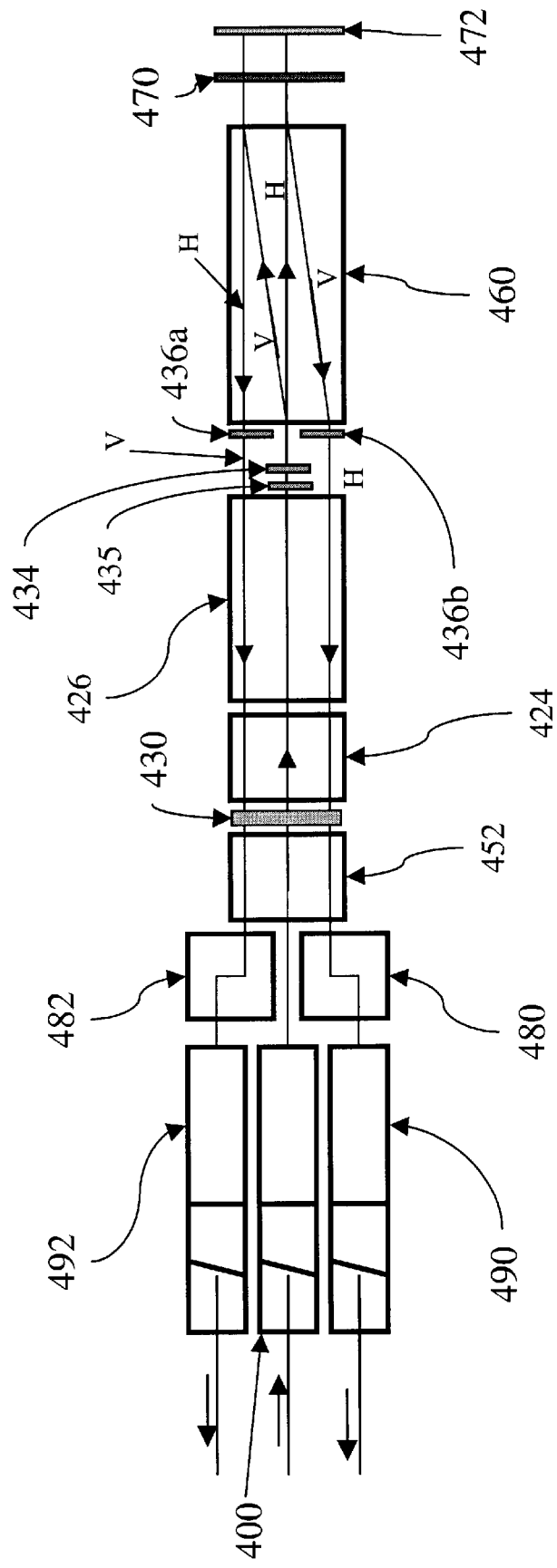
FIG. 5 illustrates a side view of one embodiment of the double-pass folded interleaver/deinterleaver of FIGS. 4a and 4b.

FIG. 5 illustrates a side view of one embodiment of the double-pass folded interleaver/deinterleaver of FIGS. 4a and 4b. The side view of FIG. 5 is from the side of port 490 and walk-off crystal 460.

When operating as a deinterleaver, the optical signal input to the interleaver/deinterleaver travels through birefringent element 420 to half wave plate 430 and walk-off crystal 460 as described above with respect to FIGS. 4a and 4b. Walk-off crystal 460 offsets the optical signals such that when the optical signals are reflected, one set of optical signals passes through half wave plate 436a and the second set of optical signals passes through half wave plate 436b.

The two optical signals are reflected back to walk-off crystal 480 and walk-off crystal 482 as described above. Walk-off crystal 480 and walk-off crystal 482 shift the optical signals to be aligned with ports 490 and 492. The signals are output through ports 490 and 492.

The polarization states of the optical signals is described in greater detail below. In one embodiment, vertically polarized signals are offset by walk-off crystal 460 while horizontally polarized signals are passed without change to the optical path. In FIG. 5, the signals passing through and from walk-off crystal 460 are labeled with polarizations (e.g., "H", "V") for purposes of explanation. Other embodiments can be provided.

In one embodiment, after passing through birefringent element 420 a sufficient number of times, even channels are vertically polarized and odd channels are horizontally polarized. Half wave plate 470 causes a 90° rotation as the beams pass from left to right, quarter wave mirror causes another 90° rotation and half wave plate 470 causes a 90° rotation as the beams pass from right to left for a total of 270° of rotation, which essentially switches the polarization of the even and odd channels (i.e., odd channels are vertically polarized and even channels are horizontally polarized). Half wave plates 436a and 436b cause a 90° rotation for the respective beams. Thus, the combination of walk-off crystal 460, half wave plate 470, quarter wave mirror 472 and half wave plates 436a and 436b result in a 360° rotation of the beams, which means that the second pass through birefringent element 420 the beams have the same polarization as the first pass.

To operate as an interleaver, two sets of optical signals are input to ports 490 and 492. The two sets of optical signals are combined in a manner that is the reverse of the deinterleaver function described above. The combined (interleaved) optical signal is output through port 400. Thus, the apparatus illustrated in FIGS. 4a and 4b can operate as an interleaver or as a deinterleaver.

Figure 6:
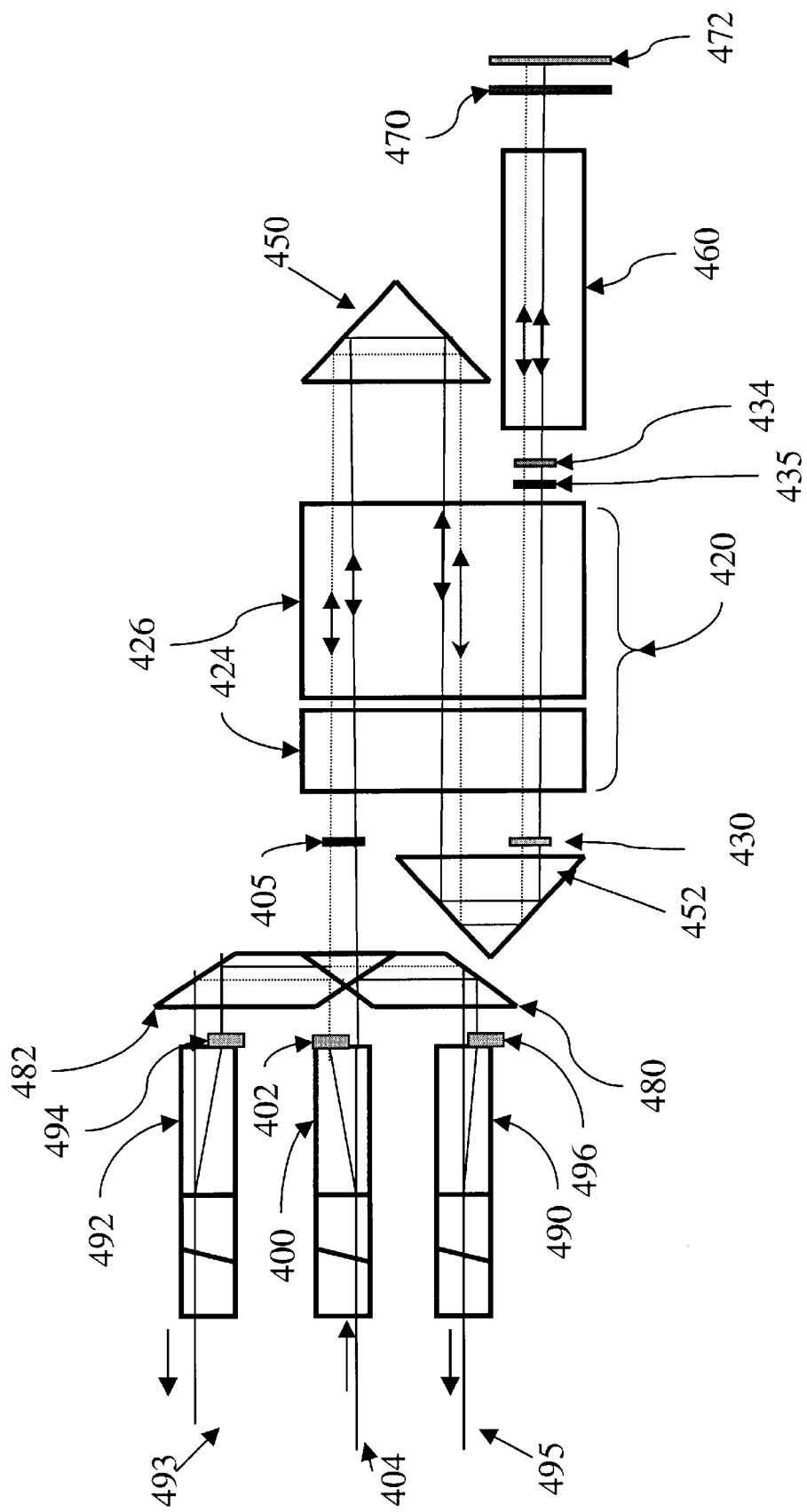
FIG. 6 illustrates a top view of one embodiment of a double-pass folded, dispersion-free interleaver/deinterleaver.

FIG. 6 illustrates a top view of one embodiment of a double-pass folded, dispersion-free interleaver/deinterleaver. The interleaver/deinterleaver of FIG. 6 operates in the same manner as the interleaver/deinterleaver of FIG. 4b, except that the even and odd channels each have a first polarization (e.g., even channels are vertically polarized and odd channels are horizontally polarized) as a result of passing through birefringent element 420. Prior to a return passage through birefringent element 420, the even and odd channels have the reverse polarization (e.g., even channels are horizontally polarized and even channels are vertically polarized).

As the beams pass through walk-off crystal 460 and half wave plate 470 to quarter wave mirror 472 and are reflected back through half wave plate 470 and walk-off crystal 460, a combined 270° of rotation occurs, which switches the polarizations of the even and odd channels. Because half wave plates 436a and 436b are absent, the polarizations of the even and odd channels have a different polarization. As described in greater detail below, the dispersions of the first pass and the second pass offset to result in a dispersion-free or nearly dispersion-free interleaver/deinterleaver.

Figure 7:
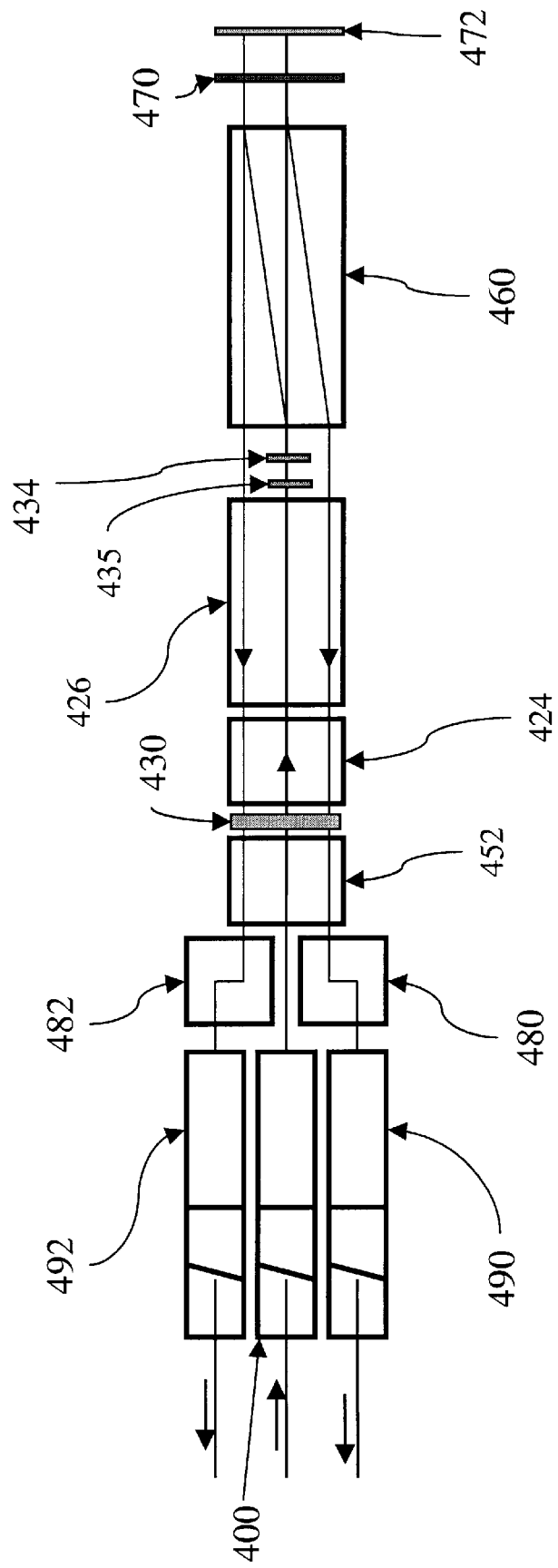
FIG. 7 illustrates a side view of one embodiment of the double-pass folded interleaver/deinterleaver of FIG. 6.

FIG. 7 illustrates a side view of one embodiment of the double-pass folded interleaver/deinterleaver of FIG. 6. Because half wave plates 436a and 436b of the interleaver/deinterleavers of FIGS. 4a and 4b are absent, the interleaver/deinterleaver of FIG. 6 causes significantly less dispersion than the interleaver/deinterleavers of FIGS. 4a and 4b.

FIG. 8 illustrates a cross-sectional view of polarization states of a double-pass optical interleaver/deinterleaver as illustrated in FIGS. 6 and 7. With respect to FIG. 8, a forward pass cross-sectional view refers to an illustration of the polarization states of one or more optical signals as the signal(s) pass from the input port(s) to quarter wave mirror 472. A backward pass cross-sectional view refers to an illustration of the polarization states of one or more signals as the signal(s) pass from quarter wave mirror 472 to the output port(s).

State 800 represents the input/output ports 400, 490 and 492 of FIGS. 6 and 7 having input/output signals 800, 890 and 892, respectively. The input and output port receive and send, respectively, optical signals having both horizontal and vertical components. The arrows of FIG. 8 indicate the polarization state sequence for a deinterleaver.

State 810 is the forward pass cross-sectional view of input optical signal 880 between walk-off crystals 480 and 482 and polarizer 405. In one embodiment, input port 400 includes a walk-off crystal to separate the input signal into two beams and a half wave plate to rotate one of the beams 90° so that both beams are horizontally polarized.

State 820 is the forward pass cross-sectional view of output optical signals 890 and 892 between birefringent element 420 and tuning plate 435. In state 820 output optical signal 890 has two vertically polarized components and output optical signal 892 has two horizontally polarized components. In one embodiment, the vertically polarized components correspond to even channels and the horizontally polarized components correspond to odd channels. In alternate embodiments, the vertically polarized components correspond to odd channels and the vertically polarized components correspond to even channels.

State 830 is the forward pass cross-sectional view of the output optical signal 890 and 892 between walk-off crystal 460 and half wave plate 470. In state 830, the vertical components of output optical signal 890 have been offset by walk-off crystal 460. State 840 is the backward pass cross-sectional view of output optical signals 890 and 892 between half wave plate 470 and walk off crystal 460. In state 840 both components of both output optical signals have been rotated 90° by quarter wave mirror 472.

State 850 is the backward pass cross-sectional view of output optical signals 890 and 892 between tuning plate 435 and birefringent element 420. Both components of output optical signal 892 have been shifted by walk-off crystal 460. The components have the opposite polarization as compared to the first pass through 435.

State 860 is the backward pass cross-sectional view of output optical signals 890 and 892 between polarizer 405 and walk-off crystals 480 and 482. Both output optical signals 890 and 892 have two horizontally polarized components that are aligned with walk-off crystals 480 and 482 respectively.

State 870 is the backward pass cross-sectional view of output optical signals 890 and 892 between walk-off crystals 480 and 482 and ports 492 and 490. Walk-off crystals 480 and 482 provide offset to align output optical signals 880 and 882 with ports 490 and 492, respectively.

Figure 9A:
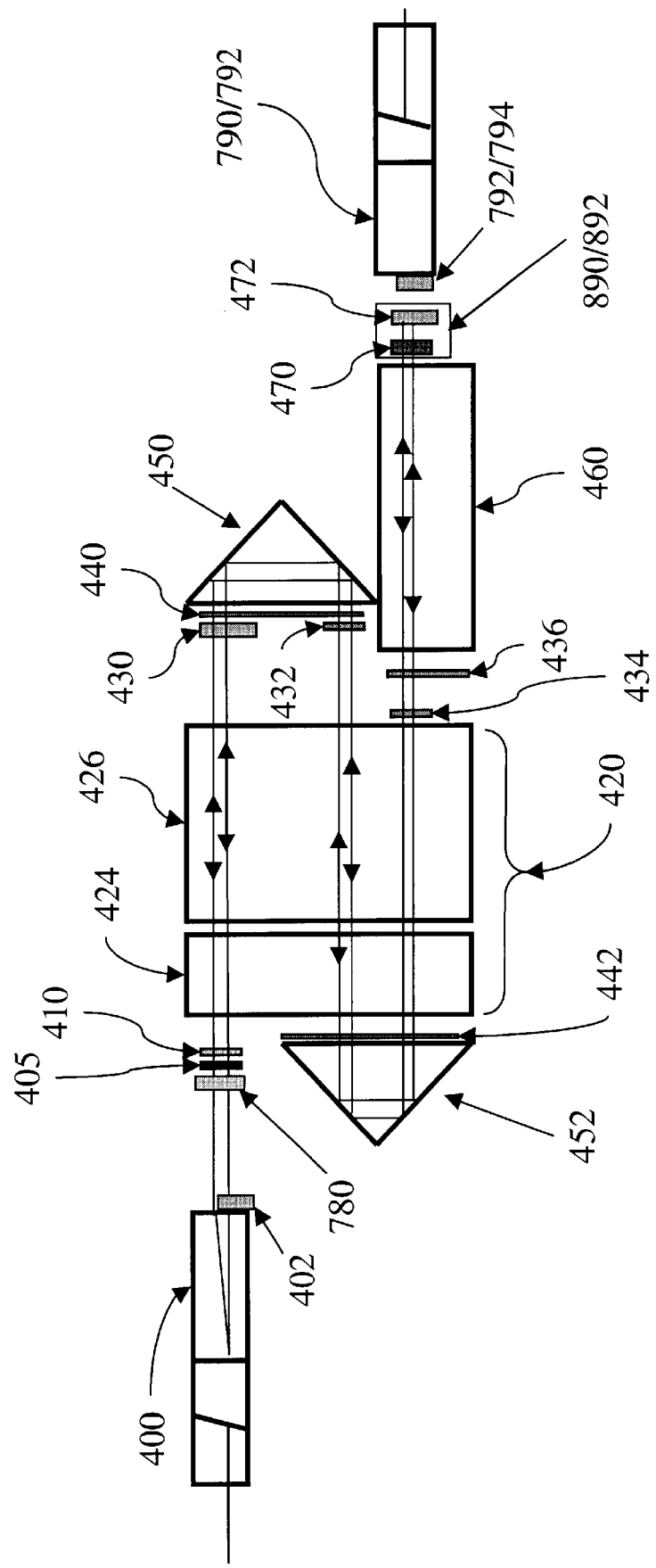
FIG. 9a illustrates a top view of one embodiment of a multi-pass optical interleaver/deinterleaver that causes dispersion.

FIG. 9a illustrates a top view of one embodiment of a multi-pass optical interleaver/deinterleaver that causes dispersion. In the multi-pass optical interleaver/deinterleaver of FIG. 9a, the optical signals make the first pass through the interleaver/deinterleaver to quarter wave mirror 472 in the same manner as with the interleaver/deinterleaver of FIG. 4a.

Quarter wave mirror 472 reflects the signals back thorough birefringent element 420 in the same manner as the interleaver/deinterleaver of FIG. 4a except that rather than being received and offset by walk off crystals 480 and 482, the optical signals pass through half wave plate 410 and polarizer 405 and are reflected by quarter wave mirrors 780. Quarter wave mirrors 780, and half wave plates 410 rotate the optical signals. The optical signals are reflected back through birefringent element 420 in a similar manner as described above through half wave plates 436a and 436b to ports 790 and 792. Dispersion is caused in the same manner as the interleaver/deinterleaver of FIG. 4a.

Ports 790/792 (port 792 is behind port 790 and therefore obscured in the illustration of FIG. 9a) include half wave plates 794/796, respectively. In one embodiment, both half wave plate 794 and half wave plate 796 have azimuth angles of 45° with respect to optical signals received from walk-off crystal 460. Half wave plates 794 and 796 rotate the optical components received such that ports 792 and 790, respectively, each receive a vertically polarized component and a horizontally polarized component, which are combined and directed to optical fibers.

To operate as an interleaver, two sets of optical signals are input to ports 790 and 792. The two sets of optical signals are combined in a manner that is the reverse of the deinterleaver function described above. The combined (interleaved) optical signal is output through port 400. Thus, the apparatus illustrated in FIG. 9a can operate as an interleaver or as a deinterleaver.

In one embodiment, the interleaver/deinterleaver of FIG. 9a is angle tuned to compensate for manufacturing tolerances. In one embodiment, angle tuning is accomplished by rotating birefringent element 420 after the interleaver/deinterleaver has been assembled so that the signals (e.g., ITU channels) interleaved or deinterleaved match the desired characteristics. Birefringent element 420 is rotated to increase the optical path length of the signals passing through birefringent element 420. When the desired optical path length is provided, birefringent element 420 is maintained in the desired position through, for example, use of epoxy or soldering techniques. Low order compensators 440 and 442 are provided to compensate for phase shift in the reflective elements 450 and 452, respectively.

Figure 9B:
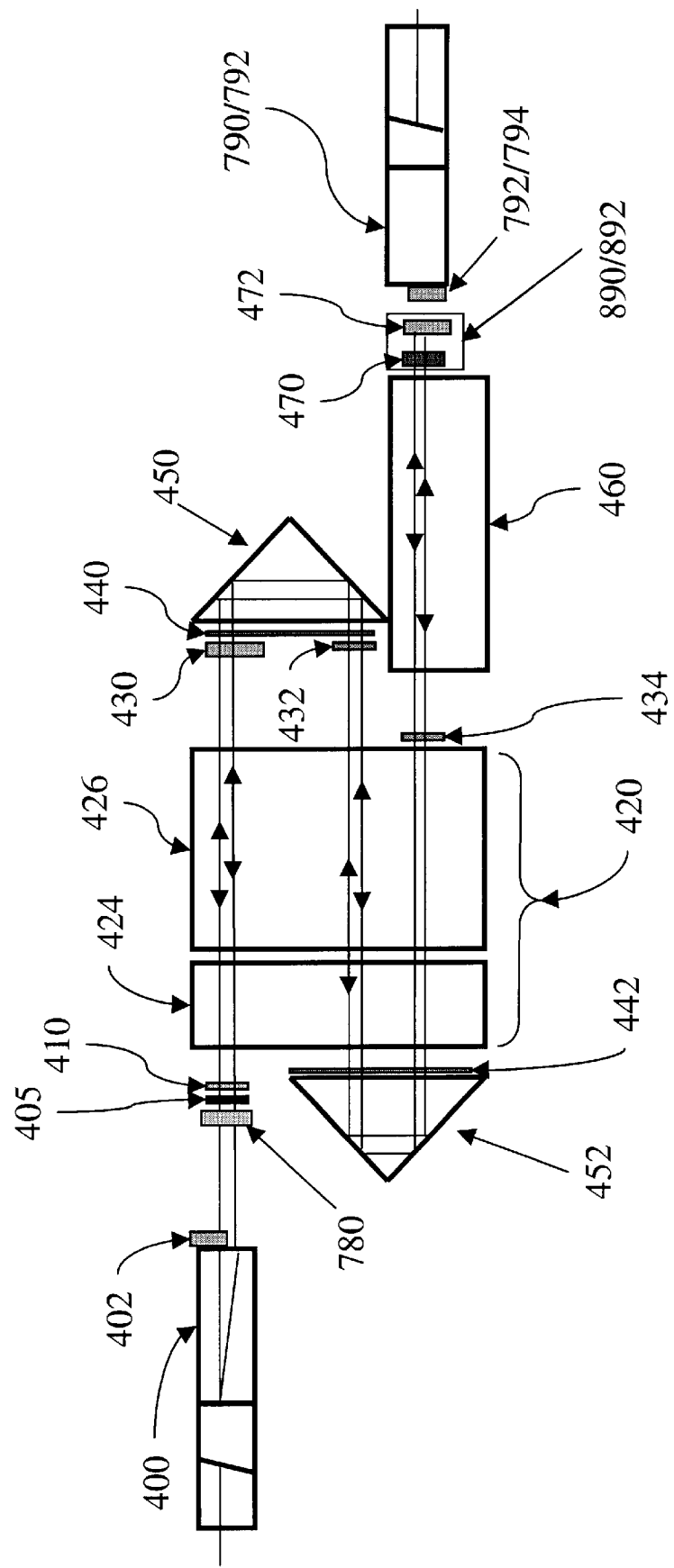

FIG. 9b illustrates a top view of one embodiment of a multi-pass optical interleaver/deinterleaver causing reduced dispersion as compared to the interleaver/deinterleaver of FIG. 9a. Because optical signals make three passes through the interleaver/deinterleaver of FIG. 9a, the resulting dispersion to the optical signals is three times the dispersion to an optical signal that makes a single pass through the device for the reasons described above.

Figure 10A:
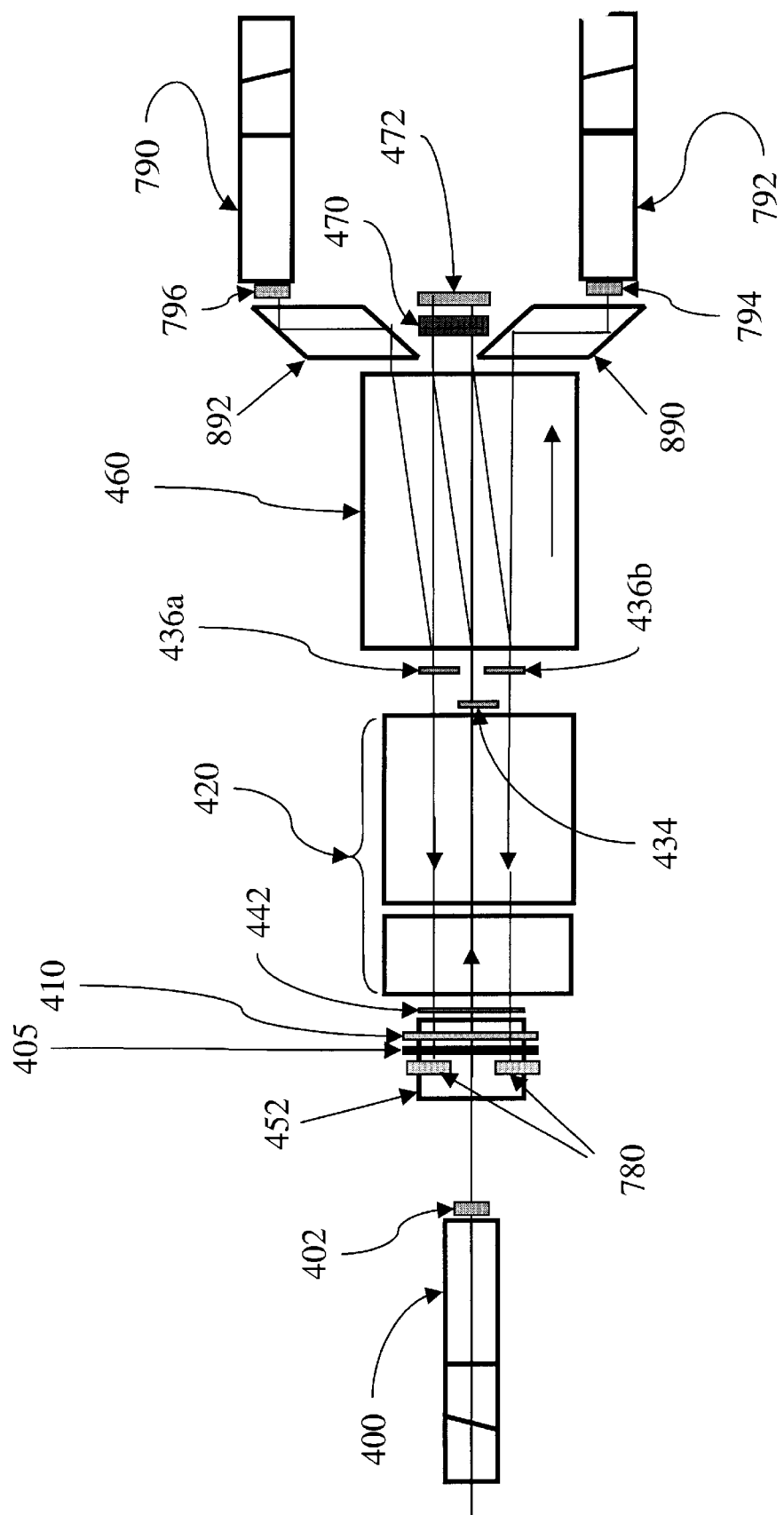

FIG. 10a illustrates a side view of the multi-pass optical interleaver/deinterleaver of FIG. 9a. As mentioned above, the optical signals make the first pass through the interleaver/deinterleaver to quarter wave mirror 472 in the same manner as with the interleaver/deinterleaver of FIG. 4a.

Walk-off crystal 460 offsets the optical signals and quarter wave mirrors 780 reflect the optical signals back through birefringent element 420 as described above. The optical signals are reflected back through birefringent element 420 in a similar manner as described above to walk-off crystals 890 and 892, which offset optical signals to ports 790 and 792, respectively.

Figure 10B:
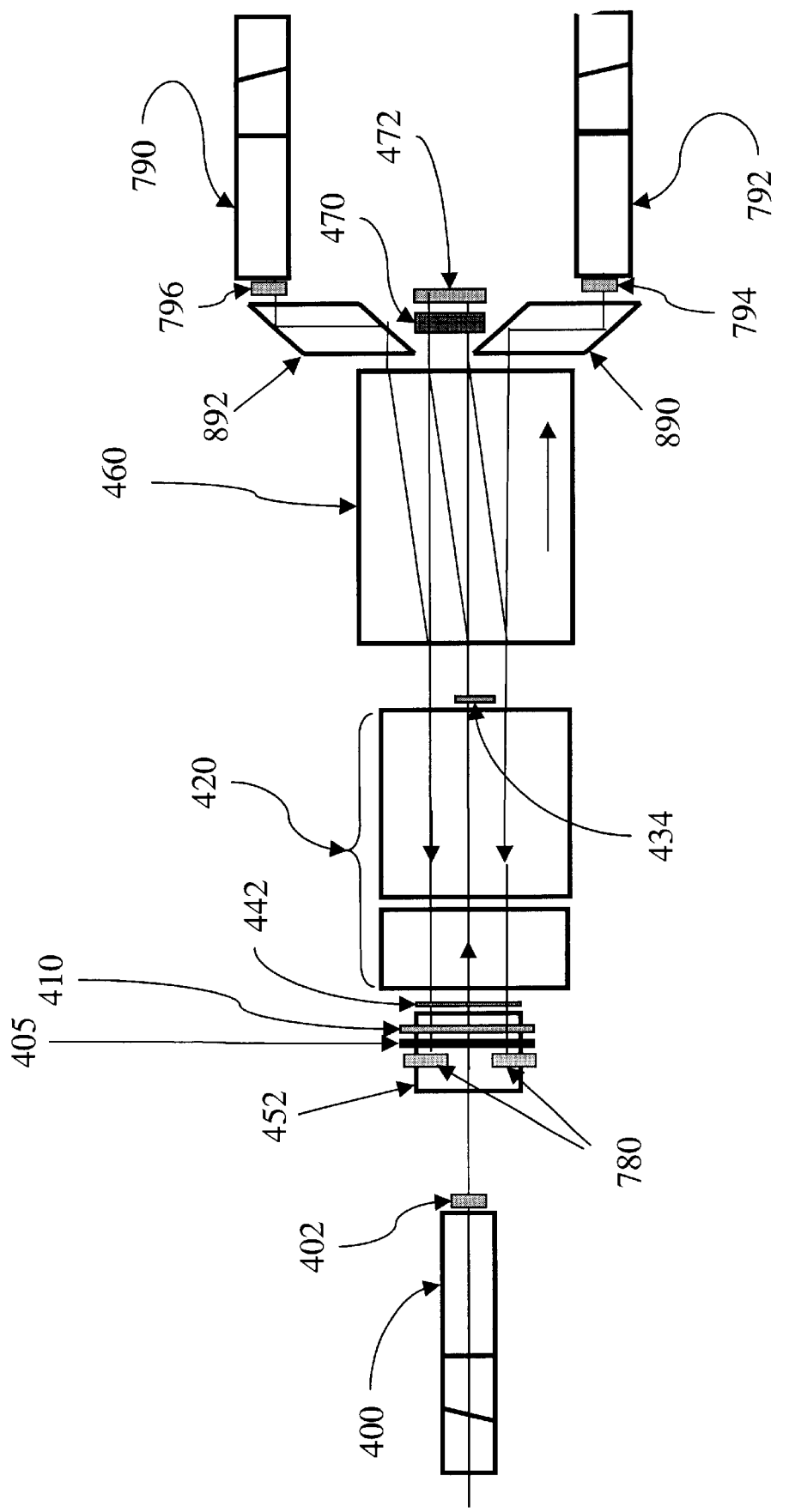
FIG. 10b illustrates a side view of the multi-pass optical interleaver/deinterleaver of FIG. 9b.

FIG. 10b illustrates a side view of the multi-pass optical interleaver/deinterleaver of FIG. 9b. Because the polarization of the optical signals that pass through the interleaver/deinterleaver of FIGS. 9b and 10b is reversed for each pass through the device, the dispersion of the optical signal is equal to the dispersion caused by a single pass through the interleaver/deinterleaver. As a general matter, signals that make an even number of passes through the interleaver/deinterleaver have little or no dispersion and signals that make an odd number of passes through the interleaver/deinterleaver have the dispersion of a single pass through the interleaver/deinterleaver.

Figure 11A:
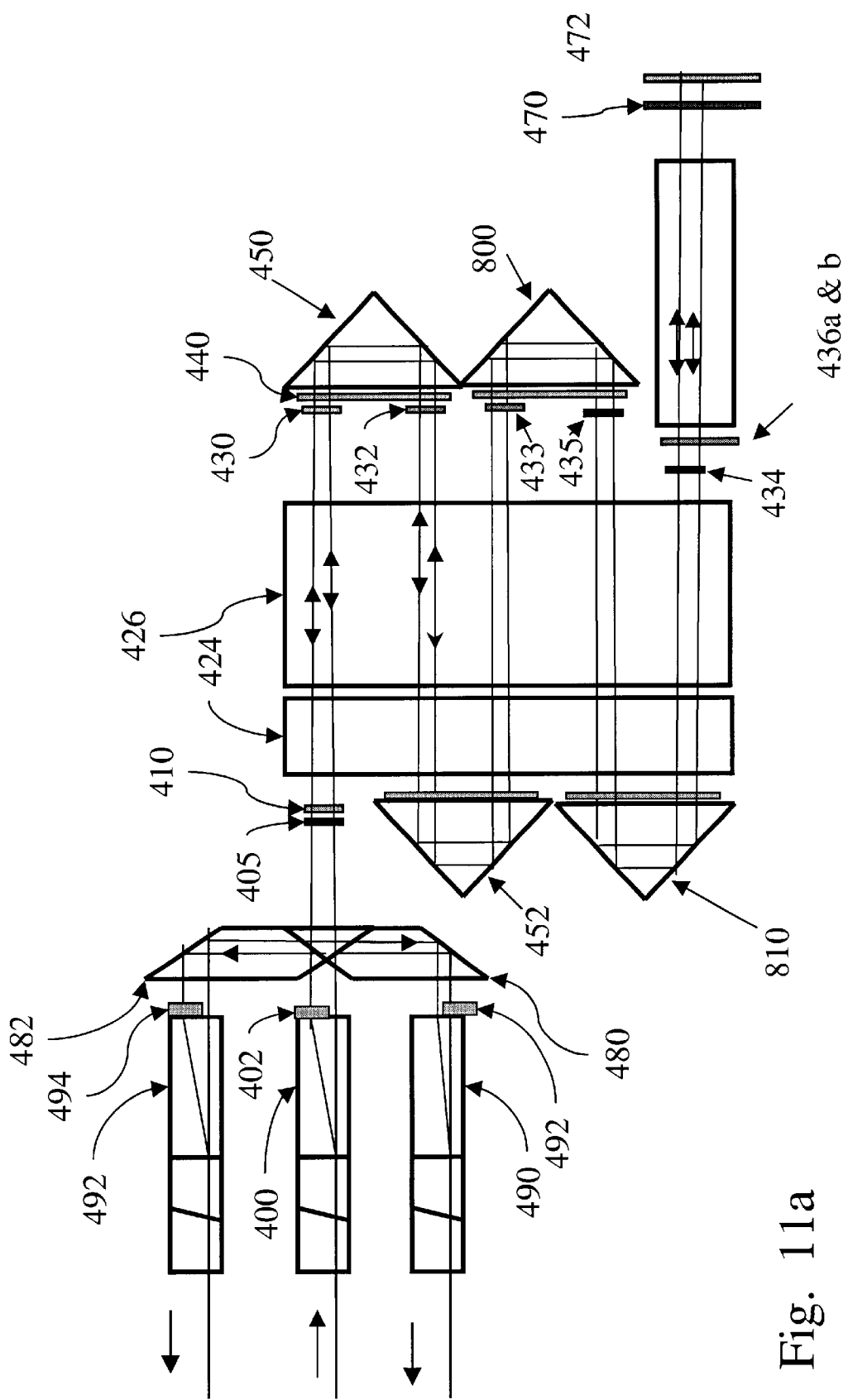
FIG. 11a illustrates a top view of one embodiment of a double-pass folded interleaver/deinterleaver that causes dispersion.

FIG. 11a illustrates a top view of one embodiment of a double-pass folded interleaver/deinterleaver that causes dispersion. The interleaver/deinterleaver of FIG. 8a includes the same components (e.g., reflective elements, half wave plates, birefringent element) as the interleaver/deinterleaver of FIG. 4a with the addition of reflective elements 800 and 810 and half wave plates 433 and 435. In one embodiment, half wave plate 433 has an azimuth angle of 22.5° for optical signals passing form reflective element 450 to birefringent element 420 and half wave plate 435 has an azimuth angle of 22.5° for optical signals passing from reflective element 800 to birefringent element 420.

In one embodiment, the components are arranged in different physical positions for the interleaver/deinterleaver of FIG. 11a compared to the interleaver/deinterleaver of FIG. 4a to provide similar functionality. The interleaver/deinterleaver of FIG. 11a provides improved filtering as compared to FIG. 4a because optical signals are passed through birefringent element 420 a greater number of times. However, because of the presence of half wave plates 436a and 436b, the interleaver/deinterleaver of FIG. 11a causes dispersion to optical signals.

In one embodiment, the interleaver/deinterleaver of FIG. 11a does not include the low-order compensators of the interleaver/deinterleaver of FIG. 4a. The optical compensation of the low-order compensators can be provided by angle tuning birefringent element 420. The increase optical path length through material of the interleaver/deinterleaver can be provided by birefringent element 420 rather than by the low-order compensators. In an alternate embodiment, the interleaver/deinterleaver of FIG. 11a can include low-order compensators as described above with respect to FIG. 4a.

Figure 11B:
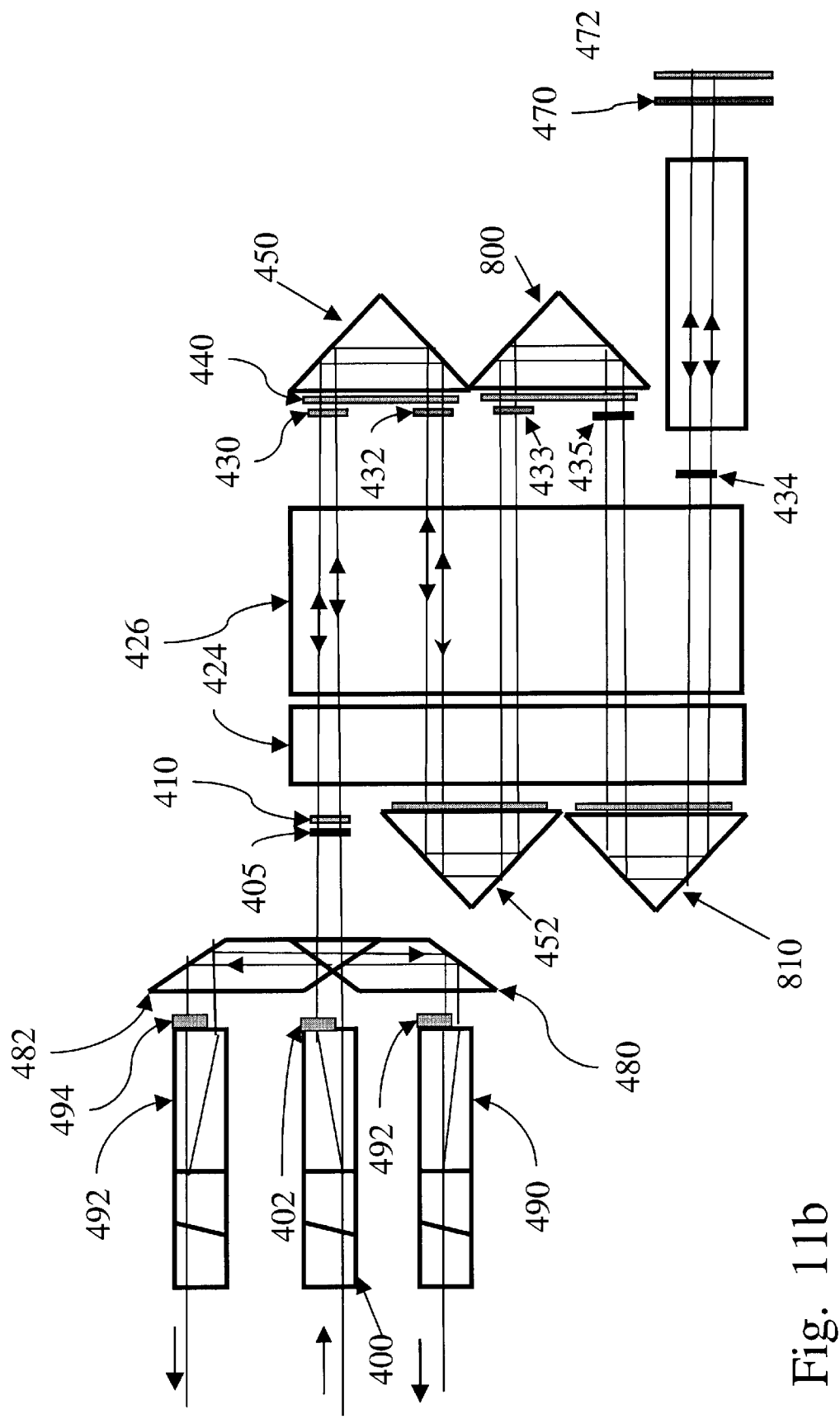
FIG. 11b illustrates a top view of one embodiment of a double-pass folded interleaver/deinterleaver that causes little or no dispersion.

FIG. 11b illustrates a top view of one embodiment of a double-pass folded interleaver/deinterleaver that causes little or no dispersion. The interleaver/deinterleaver of FIG. 11b is the same as the interleaver/deinterleaver of FIG. 11a except that the interleaver/deinterleaver of FIG. 11b does not include half wave plates 436a and 436b. The absence of half wave plates 436a and 436b allows the interleaver/deinterleaver of FIG. 11b to cause little or no dispersion.

Figure 12A:
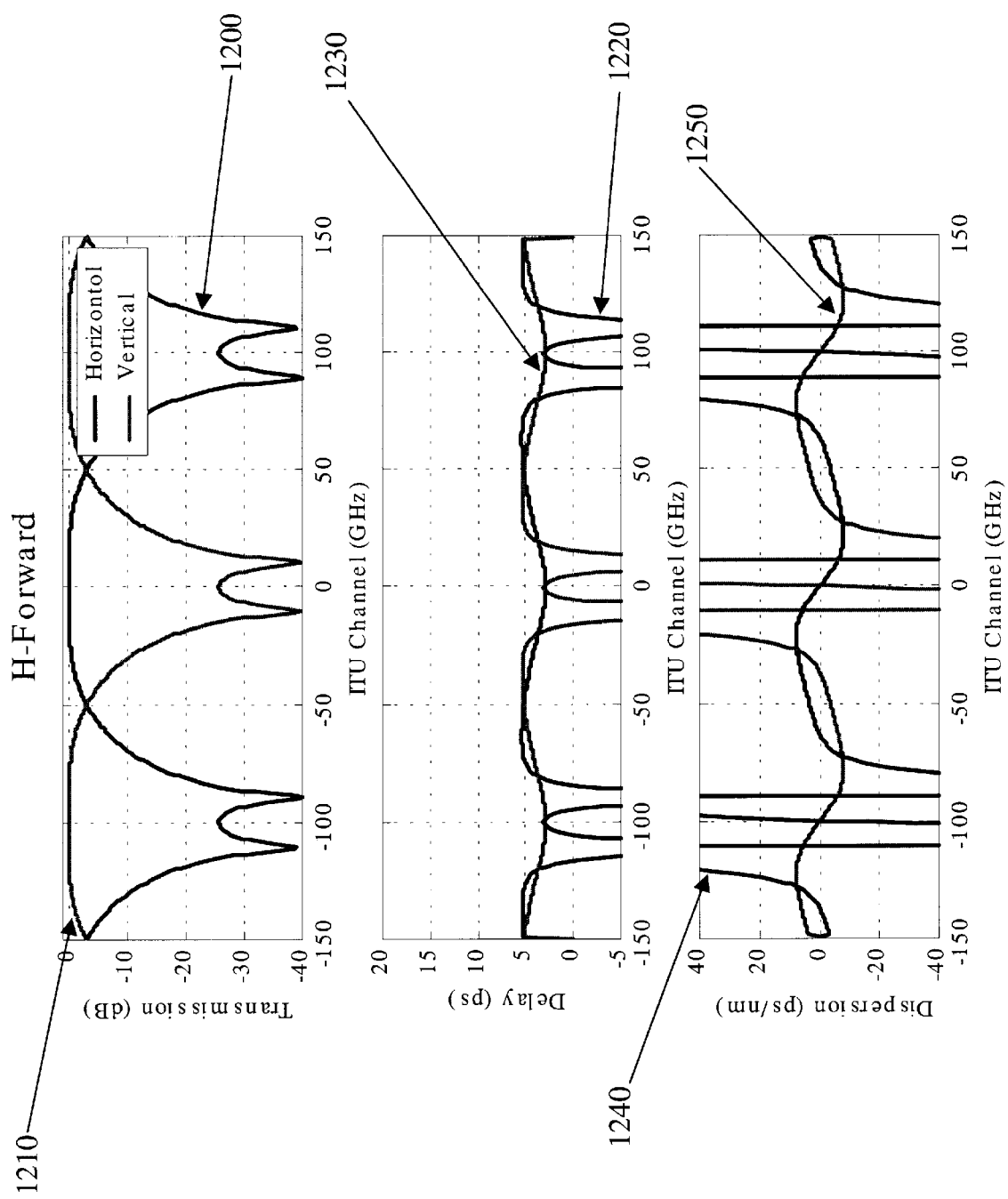
FIG. 12a illustrates representative transmission, delay and dispersion characteristics for an interleaver/deinterleaver causing substantial differential group delay (DGD) or dispersion for horizontally polarized optical signals passing in the forward direction.

FIG. 12a illustrates representative transmission, delay and dispersion characteristics for an interleaver/deinterleaver causing substantial differential group delay (DGD) or dispersion for horizontally polarized optical signals passing in the forward direction. Lines 1200 and 1210 represent transmission (in dB) characteristics for horizontally and vertically polarized signals, respectively. In the graph of FIG. 12a, a passband for horizontally polarized signals is centered around 0 GHz. Similarly, passbands for vertically polarized signals is centered around −100 GHz and 100 GHz. Thus, the transmission characteristics of the interleaver are periodic with a free spectral range (FSR) of 100 GHz. Other FSRs can also be supported.

Lines 1220 and 1230 represent delay (in picoseconds) of horizontally and vertically polarized optical signals, respectively, that pass through the inerleaver/deinterleaver. Lines 1240 and 1250 represent dispersion (in picoseconds per nanometer) of horizontally and vertically polarized optical signals, respectively, that pass through the interleaver/deinterleaver. Note that dispersion is substantial (e.g., ~±10 ps/nm) at frequencies corresponding to the passbands for the associated optical signals.

Figure 12B:
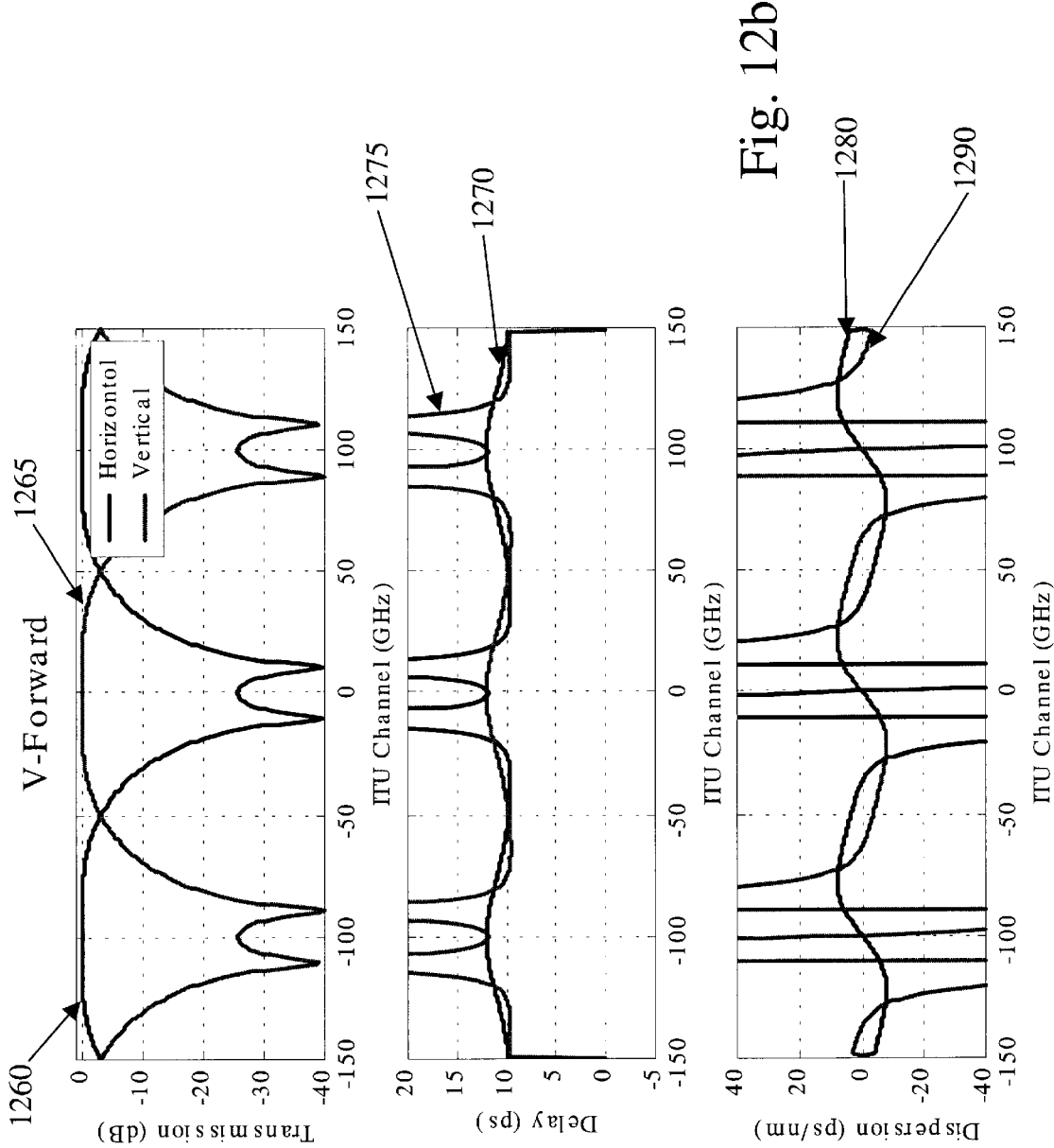
FIG. 12b illustrates representative transmission, delay and dispersion characteristics for an interleaver/deinterleaver causing substantial differential group delay (DGD) or dispersion for vertically polarized optical signals passing in the forward direction.

FIG. 12b illustrates representative transmission, delay and dispersion characteristics for an interleaver/deinterleaver causing substantial differential group delay (DGD) or dispersion for vertically polarized optical signals passing in the forward direction. Lines 1260 and 1265 represent transmission (in dB) characteristics for horizontally and vertically polarized signals, respectively. In the graph of FIG. 12b, a passband for vertically polarized signals is centered around 0 GHz. Similarly, a passband for horizontally polarized signals is centered around −100 GHz and 100 GHz. Thus, the transmission characteristics of the interleaver are periodic with a free spectral range (FSR) of 100 GHz. Other FSRs can also be supported.

Lines 1270 and 1275 represent delay (in picoseconds) of horizontally and vertically polarized optical signals, respectively, that pass through the interleaver/deinterleaver. Lines 1280 and 1290 represent dispersion (in picoseconds per nanometer) of horizontally and vertically polarized optical signals, respectively, that pass through the interleaver/deinterleaver. Note that dispersion is substantial (e.g., ~±10 ps/nm) at frequencies corresponding to the passbands for the associated optical signals.

Figure 13A:
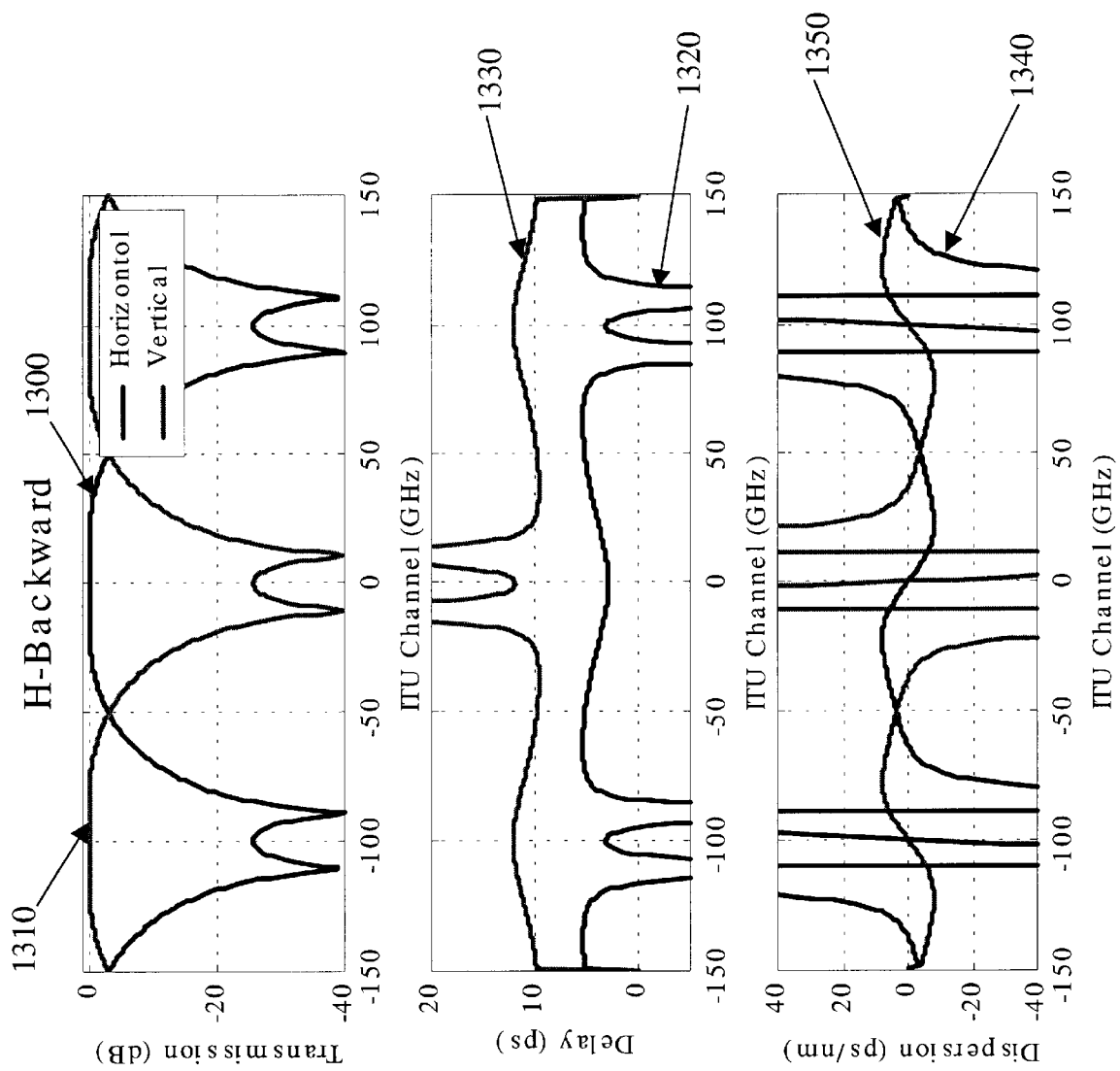
FIG. 13*a* illustrates representative transmission, delay and dispersion characteristics for an interleaver/deinterleaver causing substantial differential group delay (DGD) or dispersion for horizontally polarized optical signals passing in the backward direction.

FIG. 13*a* illustrates representative transmission, delay and dispersion characteristics for an interleaver/deinterleaver causing substantial differential group delay (DGD) or dispersion for horizontally polarized optical signals passing in the backward direction. Lines 1300 and 1310 represent transmission (in dB) characteristics for horizontally and vertically polarized signals, respectively. In the graph of FIG. 13*a*, a passband for horizontally polarized signals is centered around 0 GHz. Similarly, passbands for vertically polarized signals is centered around −100 GHz and 100 GHz. Thus, the transmission characteristics of the interleaver are periodic with a free spectral range (FSR) of 100 GHz. Other FSRs can also be supported.

Lines 1320 and 1330 represent delay (in picoseconds) of horizontally and vertically polarized optical signals, respectively, that pass through the interleaver/deinterleaver. Lines 1340 and 1350 represent dispersion (in picoseconds per nanometer) of horizontally and vertically polarized optical signals, respectively, that pass through the interleaver/deinterleaver.

Note that dispersion is substantial (e.g., ~±10 ps/nm) at frequencies corresponding to the passbands for the associated optical signals. Also note that the dispersion for the horizontally polarized input signal traveling in the backward direction is the inverse of the vertically polarized input signal traveling in the forward direction. Thus, the two dispersions can be configured such that they cancel each other.

Figure 13B:
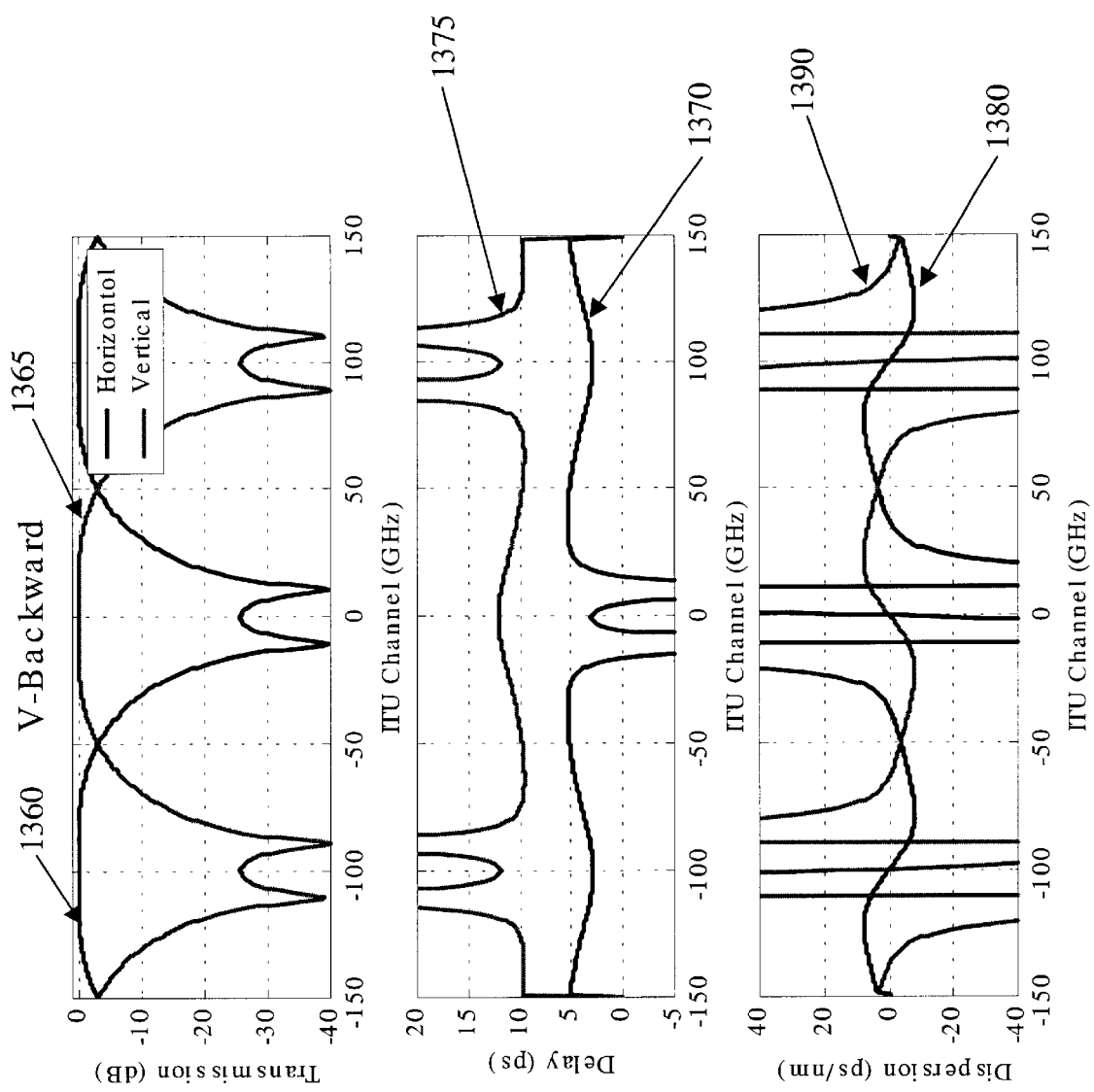
FIG. 13*b* illustrates representative transmission, delay and dispersion characteristics for an interleaver/deinterleaver causing substantial differential group delay (DGD) or dispersion for vertically polarized optical signals passing in the forward direction.

FIG. 13*b* illustrates representative transmission, delay and dispersion characteristics for an interleaver/deinterleaver causing substantial differential group delay (DGD) or dispersion for vertically polarized optical signals passing in the forward direction. Lines 1360 and 1365 represent transmission (in dB) characteristics for horizontally and vertically polarized signals, respectively. In the graph of FIG. 13*b*, a passband for vertically polarized signals is centered around 0 GHz. Similarly, a passband for horizontally polarized signals is centered around −100 GHz and 100 GHz. Thus, the transmission characteristics of the interleaver are periodic with a free spectral range (FSR) of 100 GHz. Other FSRs can also be supported.

Lines 1370 and 1375 represent delay (in picoseconds) of horizontally and vertically polarized optical signals, respectively, that pass through the inerleaver/deinterleaver. Lines 1380 and 1390 represent dispersion (in picoseconds per nanometer) of horizontally and vertically polarized optical signals, respectively, that pass through the interleaver/deinterleaver.

Note that dispersion is substantial (e.g., ~±10 ps/nm) at frequencies corresponding to the passbands for the associated optical signals. Also note that the dispersion for the vertically polarized input signal traveling in the backward direction is the inverse of the horizontally polarized input signal traveling in the forward direction. Thus, the two dispersions can be configured such that they cancel each other.

FIG. 14 is a table summarizing one approach to providing reduced or no dispersion in an optical interleaver/deinterleaver. Propagation direction refers to the direction through the birefringent element of the interleaver/deinterleaver. The forward direction corresponds to the first pass of the optical signal through the interleaver/deinterleaver, which may be multiple passes through the birefringent element. For example, referring back to FIG. 6, as the optical signal passes from fiber 404 to quarter wave mirror 472, the optical signal is traveling in the forward direction. When the optical signal is reflected by quarter wave mirror 472 and passes back to walk-off crystals 480 and 482, the optical signal is traveling in the backward direction.

Input polarization refers to the polarization of optical signals as the optical signals pass from a walk-off crystal toward the half wave plates and birefringent element. For example, in FIG. 6, the input polarization in the forward direction refers to the polarization of the optical signals immediately before the optical signals pass through polarizer 405. Output polarization refers to the polarization of the optical signals as received by a walk-off crystal at the end of the first pass. For example, in FIG. 6, output polarization in the forward direction refers to the polarization of the optical signals immediately before the optical signals pass through walk-off crystal 460.

In the backward direction, the input and output polarizations are reversed. For example, in FIG. 6, the input polarization in the backward direction refers to the polarization of the optical signals immediately after passing out of walk-off crystal 460. Output polarization in the backward direction refers to the polarization of the optical signals immediately after passing through polarizer 405.

The dispersion slope refers to the dispersion caused by the pass through interleaver/deinterleaver for the appropriate passband, as described in greater detail above with respect to FIGS. 12*a*, 12*b*, 13*a* and 13*b*. The ITU channel refers to the channels as defined by the International Telecommunications Union. Any channels spacing, or FSR, can be used.

For a double-pass interleaver/deinterleaver to be dispersion free or nearly dispersion free, the input and output polarizations for the forward and backward direction should be equal. In other words, one input polarization and one output polarization should be horizontal, and one input polarization and one output polarization should be vertical. The ordering of polarizations is not important.

For example, assuming a horizontally polarized input signal in the forward direction both the even and odd channels are horizontally polarized (H). At the output of the forward pass the even channels are horizontally polarized (H-H) and the odd channels are vertically polarized (H-V).

In the backward direction the polarizations of the optical signals are switched, as described above. Thus, the input polarization for the even channels is vertical (H-H-V) and the input polarization for the odd channels is horizontal (H-V-H). The output polarization for the even channels is vertical (H-H-V-V) and the output polarization for the odd channels is also vertical (H-V-H-V). Other configurations can also be used.

For multi-pass interleaver/deinterleavers, a similar pattern is used so that the dispersion of the first 2N passes cancel each other such that the dispersion small or non-existent. For the final pass through the interleaver/deinterleaver, some amount of dispersion is caused by the birefringence of the interleaver/deinterleaver. However, the dispersion can be reduced as compared to non-alternating polarizations.

Figure 15:
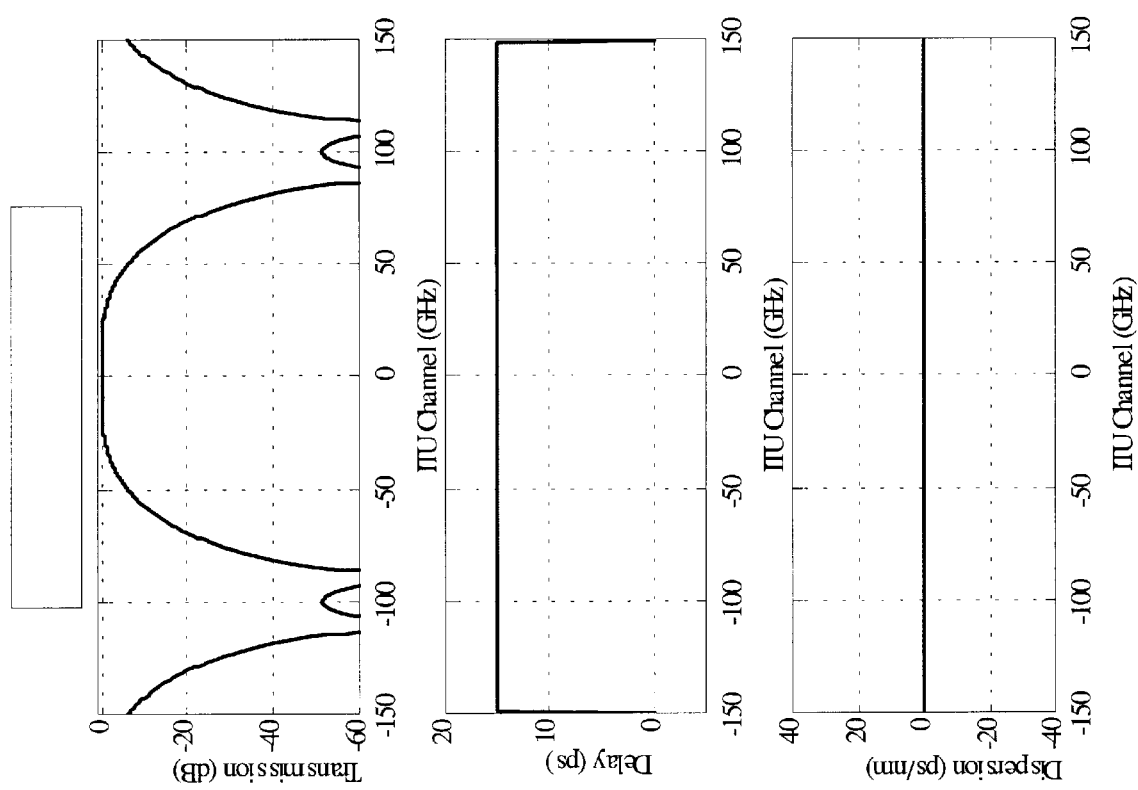
FIG. 15 illustrates representative transmission, delay and dispersion characteristics for an interleaver/deinterleaver causing little or no dispersion.

FIG. 15 illustrates representative transmission, delay and dispersion characteristics for an interleaver/deinterleaver causing little or no dispersion. The interleaver/deinterleaver for which the transmission, delay and dispersion characteristics are illustrated operate with the offsetting dispersion characteristics (e.g., H-H-V-V, H-V-H-V).

The transmission of the interleaver/deinterleaver is the same as the transmission characteristics as illustrated in FIGS. 12a, 12b, 13a and 13b. The delay is constant across all frequencies illustrated. The dispersion is zero for the frequencies illustrated. By causing positive and negative dispersion in the manner described above, the various dispersions cancel each other and the resulting dispersion for a double-pass interleaver/deinterleaver is zero.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A deinterleaver apparatus comprising:
   a first port for inputting a polarized optical signal comprising a first subset of channels and a second subset of channels;
   a second port for outputting the first subset of channels;
   a third port for outputting the second subset of channels;
   a birefringent assembly optically coupled to the first, second and third ports;
   a plurality of reflective elements positioned to reflect the optical signal through the birefringent assembly for a first pass along a first optical path, thereby providing the first subset of channels with a different polarization than the second subset of channels;
   a beam splitter positioned to receive the optical signal from the birefringent assembly, for separating the first subset of channels from the second subset of channels;
   a mirror positioned to reflect the first and second subsets of channels back to the birefringent assembly and the plurality of reflective elements for a second pass along second and third optical paths, respectively, that are parallel to the first optical path; and
   first polarization rotating means for changing the polarization of the first and second subsets of channels, whereby the polarizations of the first and second subsets of channels entering the birefringent assembly for the second pass are orthogonal to the polarizations of the first and second subsets of channels exiting the birefringent assembly after the first pass;
   wherein the optical signal received via the first port is separated into the first subset and the second subset and directed to the second port and the third port, respectively.

2. The apparatus of claim 1 further comprising second polarization rotating means positioned in any of the first, second, or third optical paths, the second polarization rotating means being oriented with azimuth angles such that the optical signal is separated into the first subset of optical channels and the second subset of optical channels and output via the second port and the third port, respectively.

3. The apparatus of claim 2 wherein the second polarization rotating means is one or more of the polarization rotating means selected from the group consisting of half-wave plates, polarizers, and tuning plates.

4. The apparatus of claim 1 wherein the plurality of reflective elements each further comprise a low-order compensator component to compensate for phase shift in the reflective element.

5. The apparatus of claim 1 wherein the optical signal received via the first port comprises a wavelength division multiplexed (WDM) optical signal.

6. The apparatus of claim 1 wherein the birefringent element comprises a single birefringent crystal.

7. The apparatus of claim 1 wherein the birefringent element comprises multiple crystals.

8. The apparatus of claim 7 wherein the birefringent assembly comprises a $TiO_2$ crystal and a $YVO_4$ crystal.

9. The apparatus of claim 1 wherein the first subset of channels comprises odd International Telecommunications Union (ITU) channels and the second subset of channels comprises even ITU channels.

10. The apparatus of claim 1 comprising:
    a second beam splitter for splitting the optical signal received via the first port into a pair of orthogonally polarized components;
    second polarization rotating means for changing the polarization of one of the components of the optical signal, whereby both components have substantially parallel polarizations, and whereby the first beam splitter separates the pair of components of the optical signal into a pair of components of the first subset of channels and a pair of components of the second subset of channels;
    third and fourth polarization rotating means for changing the polarization of one of the components of the first and second subsets of channels, respectively, whereby the components in each pair have substantially orthogonal polarizations; and
    first and second beam combiners for combining the components of the first and second subsets of channels, respectively, for output via the second and third ports.

11. The apparatus of claim 10 wherein the pair of components of the optical signal received via the first port are directed through the birefringent assembly to a first reflective element, which directs the first pair of components through the birefringent assembly a second time to a second reflective element, which directs the first pair of components through the birefringent assembly a third time to the first beam splitter.

12. The apparatus of claim 11 further comprising a third reflective element and a fourth reflective element, which receive the components of the optical signal from the second reflective element, for directing the components of the optical signal through the birefringent assembly a fourth and a fifth time to the first beam splitter.

13. The apparatus of claim 1, further comprising a set of mirrors for reflecting the first and second subsets of channels back through the birefringent assembly and the plurality of reflective elements for a third pass along fourth and fifth paths, parallel to the first path.

14. The apparatus of claim 1 further comprising a switching mechanism to switch the first and second subsets of channels between the second port and the third port.

15. The apparatus of claim 1 wherein each reflective element comprises a 90° reflective crystal.

16. An interleaver/deinterleaver apparatus comprising:
    a birefringent assembly; and
    means for reflecting an optical signal such that the optical signal makes multiple passes through the birefringent assembly following and such that the optical signal traverses the predetermined path twice having a first polarization for a first pass and a polarization that is orthogonal to the first polarization for a second pass, wherein a signal having multiple channels received via a first port is separated into a first subset of optical channels and a second subset of optical channels and directed to a second port and a third port, and further wherein optical signals received via the second port and the third port are combined into a superset of optical channels and directed to the first port.

17. The apparatus of claim 18 further comprising means for inducing a relative phase difference between the first and second subsets of optical channels of the optical signal positioned between one or more of the means for reflecting the optical signal, the means for inducing the relative phase difference being oriented with azimuth angles such that an optical signal having a set of optical channels received via the first port is separated into a first subset of optical channels and a second subset of optical channels and output via the second port and the third port, respectively, and that a set of optical channels received via the second port and a set of optical channels received via the third port are combined into a superset of optical channels and output via the first port.

18. The apparatus of claim 16 wherein the optical signal received via the first port comprises a wavelength division multiplexed (WDM) optical signal.

19. The apparatus of claim 16 wherein the birefringent element comprises a single birefringent crystal.

20. The apparatus of claim 16 wherein the birefringent element comprises multiple crystals.

21. The apparatus of claim 20 wherein the birefringent assembly comprises a $TiO_2$ crystal and a $YVO_4$ crystal.

22. The apparatus of claim 16 wherein the first subset of optical channels comprises odd International Telecommunications Union (ITU) channels and the second subset of optical channels comprises even ITU channels.

23. The apparatus of claim 16 further comprising means for switching the first and second subsets of channels between the second port and the third port.

24. An interleaver apparatus comprising:
a first port for outputting a combined optical signal comprised of first and second subsets of channels;
a second port for inputting a first optical signal comprising the first subset of channels;
a third port for inputting a second optical signal comprising the second subset of channels;
a birefringent assembly optically coupled to the first, second and third ports;
a plurality of reflective elements positioned to reflect the first and second signals through the birefringent assembly along second and third paths, respectively, thereby providing the first subset of channels with a different polarization than the second subset of channels;
a first polarization dependent combiner, positioned to receive the first and second signals from the birefringent assembly, for combining the first and second subsets of channels into the combined optical signal;
a first set of one or more mirrors positioned to reflect the combined optical signal back through the birefringent assembly and the plurality of reflective elements along a first optical path that is parallel to the second and third paths; and
first polarization rotating means for changing the polarization of the first and second subsets of channels, whereby the polarizations of the first and second subsets of channels entering the birefringent assembly for the second pass are orthogonal to the polarizations of the first and second subsets of channels exiting the birefringent assembly after the first pass;
wherein optical signals received via the second port and the third port are combined and directed to the first port.

25. The apparatus of claim 24 further comprising second polarization rotating means positioned in any of the first, second, or third optical paths, the second polarization rotating means being oriented with azimuth angles such that the first subset of optical channels received via the second port and the second subset of optical channels received via the third port are combined into a superset of optical channels in the first signal and output via the first port.

26. The apparatus of claim 25 wherein the second polarization rotating means is one or more of the polarization rotating means selected from the group consisting of halfwave plates, polarizers, and tuning plates.

27. The apparatus of claim 24 wherein the plurality of reflective elements each further comprise a low-order compensator component to compensate for phase shift in the reflective element.

28. The apparatus of claim 24 wherein the first and second optical signals received via the second and third ports comprise wavelength division multiplexed (WDM) optical signals.

29. The apparatus of claim 24 wherein the birefringent element comprises a single birefringent crystal.

30. The apparatus of claim 24 wherein the birefringent element comprises multiple crystals.

31. The apparatus of claim 30 wherein the birefringent assembly comprises a $TiO_2$ crystal and a $YVO_4$ crystal.

32. The apparatus of claim 24 wherein the first subset of optical channels comprises odd International Telecommunications Union (ITU) channels and the second subset of optical channels comprises even ITU channels.

33. The apparatus of claim 24 comprising:
first and second beam splitters for splitting the first and second optical signals, respectively, received via the second and third ports into pairs of orthogonally polarized components;
third and fourth polarization rotating means for changing the polarization of one of each pair of the components of the first and second signals, whereby the components in each pair have parallel polarizations and whereby the first combiner combines the components of the first and second signals into a pair of combined optical signal components;
fourth polarization rotating means for changing the polarization of one of the pair of the components of the combined optical signal, whereby the components of the combined optical signal have orthogonal polarizations; and
first combining means for combining the components of the combined optical signal for output via the first port.

34. The apparatus of claim 33 wherein the pairs of components of the first and second optical signals received via the second and third ports, respectively, are directed through the birefringent assembly to a first reflective element, which directs the pairs of components through the birefringent assembly a second time to a second reflective element, which directs the pairs of components through the birefringent assembly a third time to the first beam combiner.

35. The apparatus of claim 34 further comprising a third reflective element and a fourth reflective element, which receive the components of the first and second optical signals from the second reflective element, for directing the components of the first and second optical signals through the birefringent assembly a fourth and a fifth time to the first beam combiner.

36. The apparatus of claim 24, further comprising a second set of mirrors for reflecting the first and second signals after the first pass back through the birefringent assembly and the plurality of reflective elements for the second pass to the first set of mirrors, which reflects the first and second signals back through the birefringent assembly and the plurality of reflective elements for a third pass.

37. The apparatus of claim 24 wherein each reflective element comprises a 90° reflective crystal.

* * * * *